(12) United States Patent
Song et al.

(10) Patent No.: US 10,361,584 B2
(45) Date of Patent: Jul. 23, 2019

(54) SYSTEM FOR MANAGING ENERGY, METHOD OF MANAGING ENERGY, AND METHOD OF PREDICTING ENERGY DEMAND

(71) Applicant: KOREA INSTITUTE OF ENERGY RESEARCH, Daejeon (KR)

(72) Inventors: Yu-jin Song, Daejeon (KR); Yoon-dong Sung, Daejeon (KR)

(73) Assignee: Korea Institute of Energy Research (KR)

( * ) Notice: Subject to any disclaimer, the term of this patent is extended or adjusted under 35 U.S.C. 154(b) by 109 days.

(21) Appl. No.: 15/352,983

(22) Filed: Nov. 16, 2016

(65) Prior Publication Data

US 2018/0138742 A1    May 17, 2018

(51) Int. Cl.
| | |
|---|---|
| *G06N 5/04* | (2006.01) |
| *H02J 13/00* | (2006.01) |
| *H02J 3/14* | (2006.01) |
| *H02J 3/32* | (2006.01) |
| *G05B 13/02* | (2006.01) |
| *H02J 3/00* | (2006.01) |

(52) U.S. Cl.
CPC ............ *H02J 13/0006* (2013.01); *G06N 5/04* (2013.01); *H02J 3/14* (2013.01); *H02J 3/32* (2013.01); *G05B 13/0265* (2013.01); *H02J 2003/003* (2013.01); *H02J 2003/143* (2013.01); *Y02B 70/3225* (2013.01); *Y02B 70/3266* (2013.01); *Y04S 20/222* (2013.01); *Y04S 20/242* (2013.01)

(58) Field of Classification Search
None
See application file for complete search history.

(56) References Cited

U.S. PATENT DOCUMENTS

| | | |
|---|---|---|
| 9,112,411 B2 | 8/2015 | Chae et al. |
| 9,293,945 B2 | 3/2016 | Song et al. |
| 9,490,709 B2 | 11/2016 | Lee et al. |
| 2015/0115891 A1 | 4/2015 | Sung et al. |
| 2015/0127180 A1 | 5/2015 | Oh et al. |
| 2015/0364982 A1 | 12/2015 | Chae et al. |

OTHER PUBLICATIONS

Mamidi et al., "Improving Building Energy Efficiency with a Network of Sensing, Learning and Prediction Agent", Proceedings of the 11th International Conference on Autonomous Agents and Multiagent Systems—Innovative Applications Track, AAMAS 2012.*

* cited by examiner

*Primary Examiner* — Carlos R Ortiz Rodriguez
(74) *Attorney, Agent, or Firm* — Harness, Dickey & Pierce, PLC

(57) ABSTRACT

Disclosed is a system for managing energy of a community in which at least one building exists. The system includes a community agent for managing community energy demand prediction data including building energy demand prediction data of each building and a community demand reaction load capacity including a building demand reaction load capacity of each building and managing a community demand reaction incentive policy applied to the community; and a machine learning device for generating a building demand reaction incentive policy to be applied to each building through a community-optimized machine learning model.

16 Claims, 28 Drawing Sheets

SYSTEM FOR MANAGING ENERGY, METHOD OF MANAGING ENERGY, AND METHOD OF PREDICTING ENERGY DEMAND

BACKGROUND OF THE INVENTION

1. Field of the Invention

The present invention relates to a technology for managing energy.

2. Description of the Prior Art

As an energy demand currently increases rapidly, a power shortage phenomenon has become serious. In order to resolve the power shortage phenomenon, electricity generation and power transmission and distribution facilities have been additionally installed causing social costs to sharply increase, and so an expansion of supply of power is delayed. Accordingly, the government is switching an energy policy from a past supply-centered policy to a demand-centered policy.

A power demand management corresponds to a method of changing power use patterns of consumers to minimize the costs and stably meet the power demand. The power demand management may be divided into a demand reaction and increasing an energy usage rate. When the power demand management is applied to a building, home, or factory, a large effect thereof may appear.

As various smart grid technologies such as new renewable energy including sunlight and the like, an LED lighting, an Energy Storage System (ESS), an electronic car, a smart meter, and the like are recently introduced to a building, a market demand for a Building Energy Management System (BEMS), a Home Energy Management System (HEMS), and a Factory Management System (FMS) to control power consumption of the building technology through an integrated operation thereof has increased.

However, the conventional BEMS, HEMS, and FEMS adopt a centralized integrated control type and thus cannot reflect an environment difference between detailed zones.

For example, when applying a demand reaction incentive policy, the conventional technology applied a single demand reaction incentive policy to an entire area (an entire community area or an entire building area). However, there may be an environmental difference between the detailed zones and tendencies of users living in the corresponding zones, so that the single demand reaction incentive policy cannot achieve an overall high-level result. Further, when the system increases compulsion and responds to the demand reaction, user convenience may deteriorate.

Since the conventional BEMS, HEMS, and FEMS adopt the centralized integrated control type, the BEMS, HEMS, and FEMS cannot smoothly handle failure of some elements and also should fix the system whenever a new element is added.

Such a centralized integrated type manages and controls whole elements through a single Energy Management System (EMS) algorithm. Specifically, the type controls blocks having different power consumption patterns through a single EMS algorithm, and thereby cannot optimize supply and demand of energy according to each power consumption pattern.

The centralized integrated control type cannot effectively manage a local load change generated in each zone of the building.

The centralized integrated control type requires modifications of the whole EMS and recompilation whenever a device is added or removed, thereby increasing a maintenance cost.

The centralized integrated control type is insufficient to reflect a present condition of occupancy of an occupant, an energy use pattern, and convenience.

SUMMARY OF THE INVENTION

Based on such a background, in accordance with an aspect of the present invention, the present invention has been made to provide an Energy Management System (EMS) technology that reflects various (energy) environments for each zone of the building.

In accordance with another aspect of the present invention, the present invention has been made to provide an EMS technology which does not degrade reliability of a total system in spite of some failure.

In accordance with another aspect of the present invention, the present invention has been made to provide an EMS technology in which plug & play of the device is possible.

In accordance with another aspect of the present invention, the present invention has been made to provide an EMS technology which reflects a present condition of occupancy of an occupant, an energy use pattern, and convenience.

In accordance with another aspect of the present invention, the present invention has been made to provide an energy management system for optimally determining user convenience and energy costs according to each zone of the building.

In accordance with another aspect of the present invention, the present invention has been made to provide a technology for solving the problem of the conventional top-down type (a centralized integrated control type) and reflecting an independent energy management policy of each zone to determine an energy management policy of the entire area.

According to an aspect of the present invention in order to achieve the above described objective, a system for managing energy of a community in which at least one building having at least one divided zone is located is provided. The system includes: at least one zone agent for acquiring environment data of each zone from a sensor network installed in each zone, acquiring device energy usage data of an energy device and a personal device operating in each zone, and managing physical information of each zone; a machine learning device for generating occupant estimation information of each zone through a first machine learning model including temperature data and $CO_2$ data of the environment data and the device energy usage data of the personal device as input data, generating zone energy demand prediction data of each zone through a second machine learning model including the occupant estimation information, the environment data, the device energy usage data of the energy device and the personal device, and the physical information of each zone as input data, and transmitting the generated occupant estimation information and zone energy demand prediction data to the zone agent, wherein the zone agent manages energy of each zone based on the zone energy demand prediction data received for each zone.

According to another aspect of the present invention, a method of managing energy of a community in which at least one building having at least one divided zone is located is provided. The method includes: acquiring environment data of each zone from a sensor network installed in each zone, acquiring device energy usage data of an energy device and a personal device operating in each zone, and acquiring physical information of each zone; calculating a number of occupants in each zone through a first machine learning model including temperature data and $CO_2$ data of the environment data and the device energy usage data of the personal device as input data, and generating zone energy demand prediction data of each zone through a second machine learning model including the occupant estimation information, the environment data, the device energy usage data of the energy device and the personal device, and the physical information of each zone as input data; and managing energy of each zone based on the zone energy demand prediction data.

According to another aspect of the present invention, a method of predicting an energy demand for a community in which at least one building divided into at least one zone exists is provided. The method includes: calculating a number of occupants in each zone through a first machine learning model including $CO_2$ data of each zone as input data; generating zone energy demand prediction data of each zone through a second machine learning model including the number of occupants, environment data of each zone, and device energy usage data as input data; generating building energy demand prediction data of each building through a third machine learning model including zone energy demand prediction data of each zone and state information of a building device, which does not belong to each zone, as input data; and generating community energy demand prediction data of the community through a fourth machine learning model including building energy demand prediction data of each building and state information of a community device, which does not belong to each building, as input data.

According to the present invention as described above, the EMS device can reflect various (energy) environments for each zone of a building, a reliability of a total system does not deteriorate even though a partial failure is generated, plug & play of the device is possible, and a present condition of occupancy of an occupant, an energy use pattern, and convenience can be reflected. Further, according to the present invention, it is possible to provide an energy management system technology for optimally determining user convenience and energy costs for each zone of the building. In addition, according to the present invention, it is possible to solve the problem of the conventional top-down type (a centralized integrated control type) and reflect an independent energy management policy of each zone to determine an energy management policy of the entire area.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
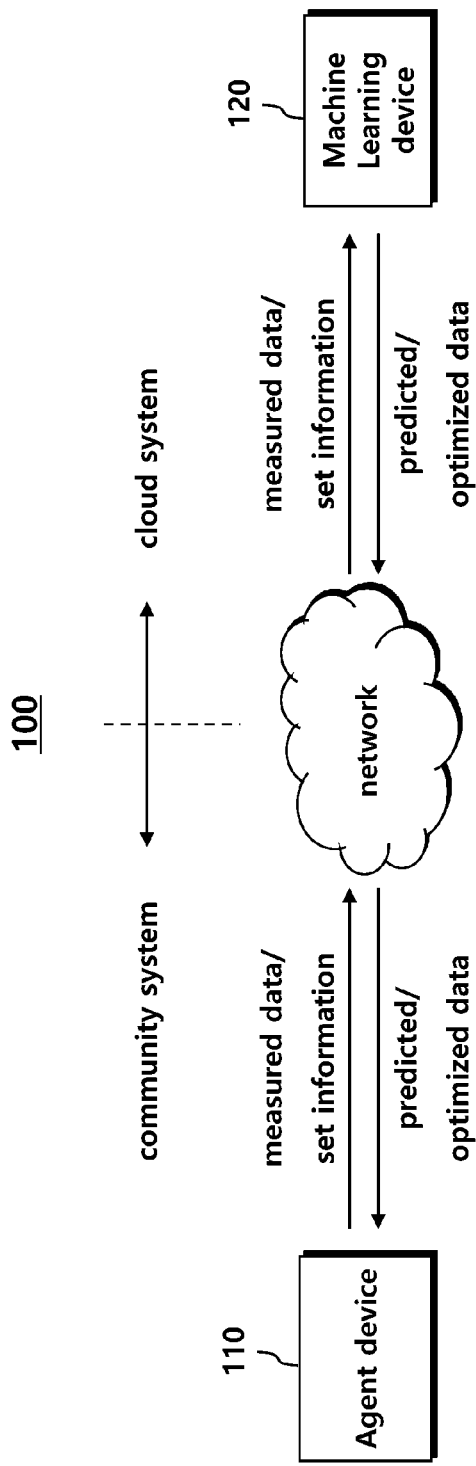
FIG. 1 is a conceptual diagram illustrating an energy management system according to an embodiment.

Hereinafter, embodiments of the present invention will be described in detail with reference to the accompanying drawings. In the following description, the same components will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a conceptual diagram illustrating an energy management system according to an embodiment.

Referring to FIG. 1, an energy management system 100 includes a community system and a cloud system.

The community system includes at least one agent device 110 and the cloud system includes at least one machine learning device 120.

The agent device 110 generates measured data from various sensors and meters located within a community space and then transmits the generated measured data to the machine learning device 120 through a network. Further, the agent device 110 includes a User Interface (UI) device and transmits set information acquired from a user to the machine learning device 120 through the UI device.

The machine learning device 120 generates predicted data and optimized data through a machine learning model that uses the measured data and the set information received from the agent device 110 as input data and transmits the generated predicted data and optimized data to the agent device 110.

The agent device 110 manages community energy based on the predicted data and the optimized data received from the machine learning device 120.

In the community, the agent device 110 may be hierarchically disposed, and the agent device 110 disposed on each layer may transmit and receive information while independently communicating with the machine learning device 120.

A hierarchical structure of the community will be described with reference to FIGS. 2 to 5.

Figure 2:
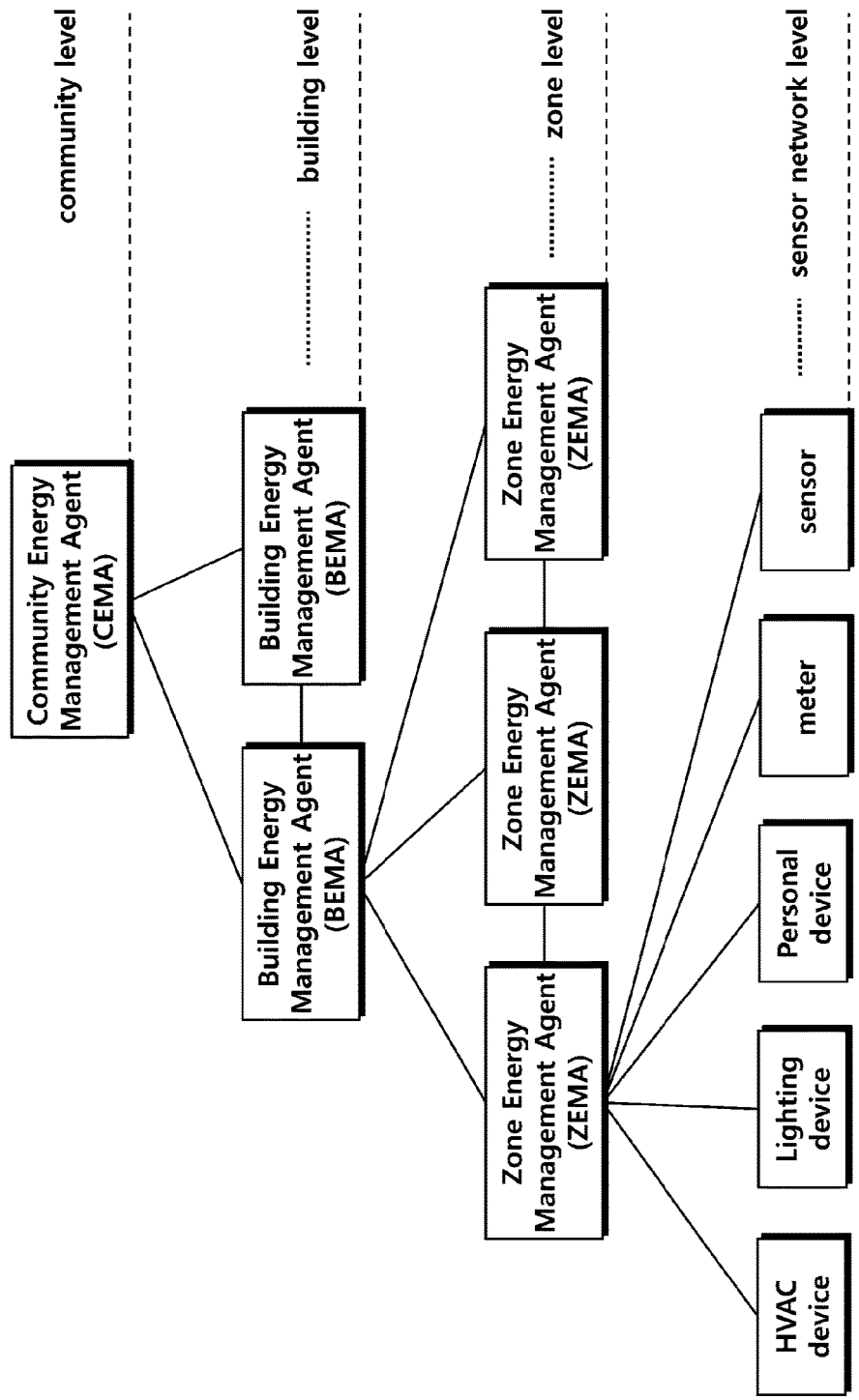
FIG. 2 illustrates a hierarchical structure of the community.

FIG. 2 illustrates a hierarchical structure of the community.

Referring to FIG. 2, a Community Energy Management Agent (CEMA) is located at a highest community level, and at least one Building Energy Management Agent (BEMA) connected to the CEMA is located at a next building level. Further, at least one Zone Energy Management Agent (ZEMA) connected to each BEMA is located at a next zone level, and an energy device, for example, an HAVC device, a lighting device, or the like, a personal device, for example, a Personal Computer (PC), or the like, a meter, a sensor, and the like located at a lowest sensor network level is located in each ZEMA.

Figure 3:
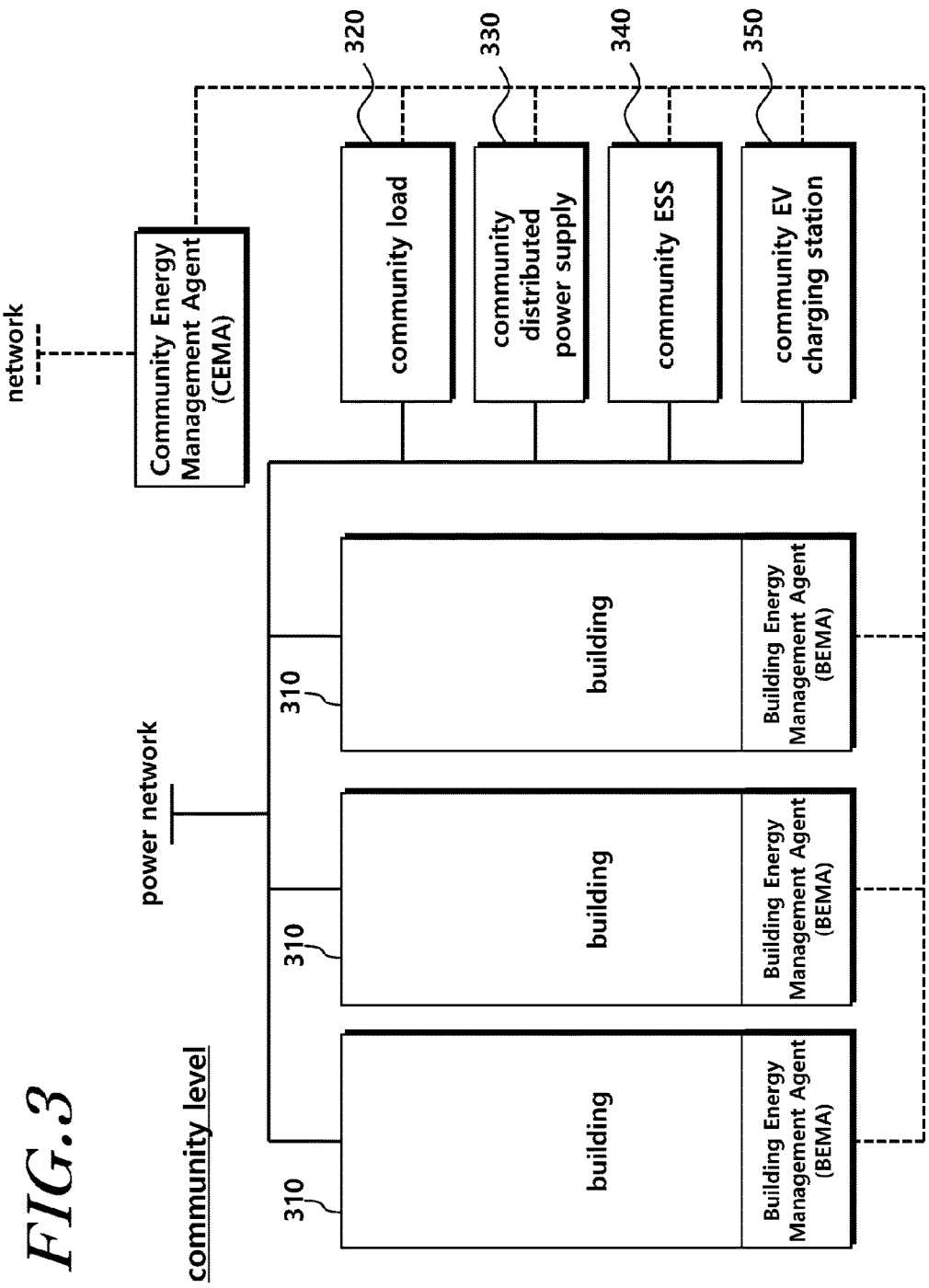
FIG. 3 is a block diagram illustrating a community level system.

FIG. 3 is a block diagram illustrating a community level system.

Referring to FIG. 3, at least one building 310 is located in the community. Further, the community may include community devices, which do not belong to the building 310, for example, a community load 320 such as a street lamp, a traffic signal system, and the like. The community corresponds to a community device and may include a community distributed power supply 330, a community Energy Storage System (ESS) 340, a community Electric Vehicle (EV) charging station 350, and the like.

The community may include all the aforementioned community devices such as the community load 320, the community distributed power supply 330, the community ESS 340, and the community EV charging station 350 or may include at least one community device thereof.

A community agent (CEMA) for managing total community energy is located in the community. The CEMA is connected to the BEMA located in each building 310 and manages each BEMA. Further, the CEMA is connected to the community devices 320, 330, 340, and 350, which do not belong to each building, and acquires state information of each of the community devices 320, 330, 340, and 350 and controls each of the community devices 320, 330, 340, and 350.

Figure 4:
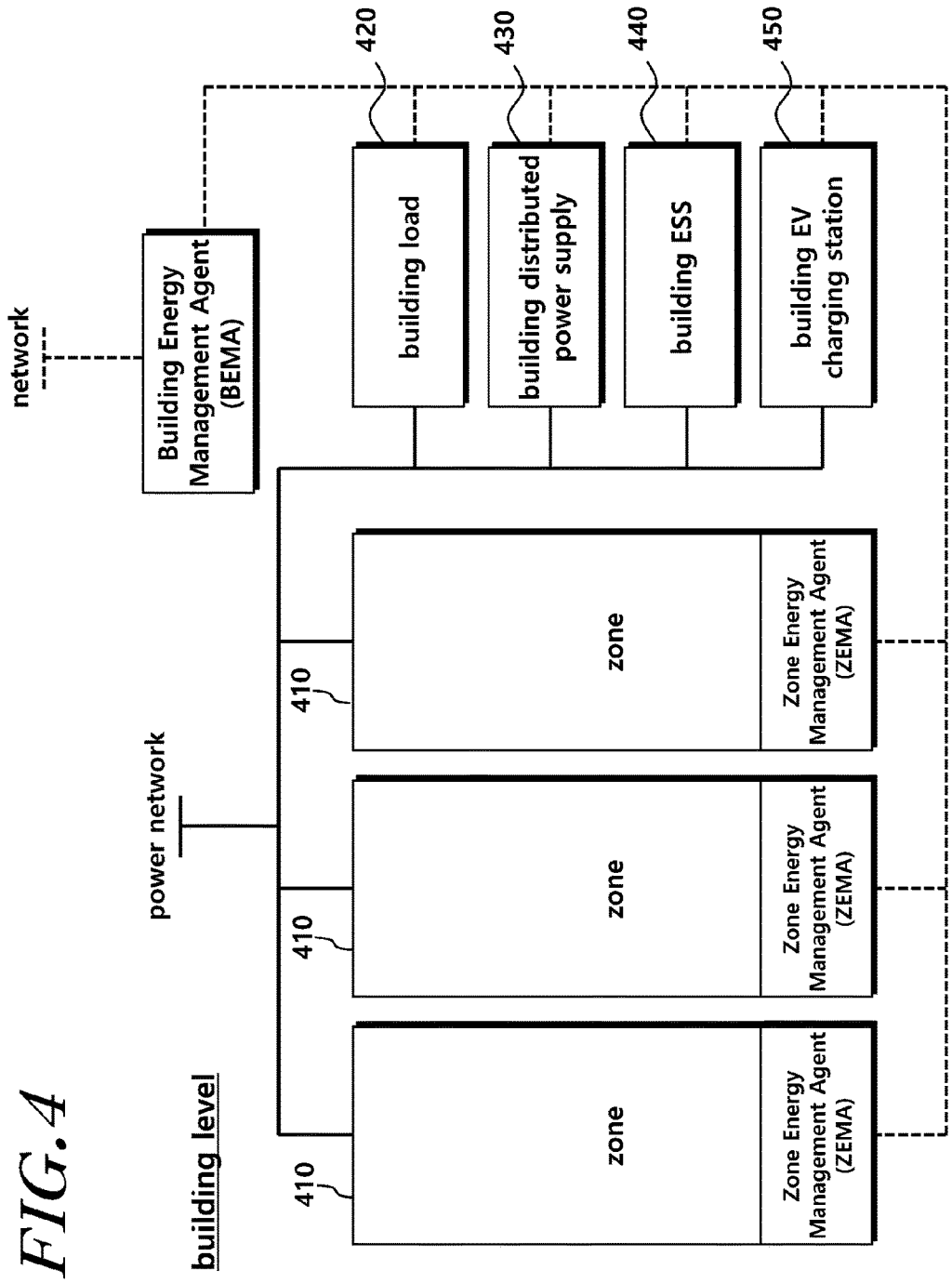
FIG. 4 is a block diagram illustrating a building level system.

FIG. 4 is a block diagram illustrating a building level system.

Referring to FIG. 4, each building is divided into at least one zone 410.

A person who constructs the energy management system according to an embodiment may divide each building into a plurality of thermal zones. The thermal zone may refer to a zone in which a thermal energy device, for example, a cooling and heating device is independently controlled. Different thermal zones may be controlled in different thermal states. For example, a first thermal zone may be controlled to have an indoor temperature of 23 degrees, and a second thermal zone may be controlled to have an indoor temperature of 28 degrees.

Building devices, which do not belong to each zone 410, may be included in the building. For example, the building may include a building load 420 such as an elevator load or the like, a building distributed power supply 430, a building ESS 440, a building EV charging station 450, and the like.

A building agent (BEMA) for managing total building energy is located in the building. Further, the BEMA is connected to a zone agent (ZEMA) located in each zone 410 and manages each ZEMA. The BEMA is connected to building devices 420, 430, 440, and 450, which do not belong to each zone, and acquires state information of each of the building devices 420, 430, 440, and 450 and controls each of the building devices 420, 430, 440, and 450.

Figure 5:
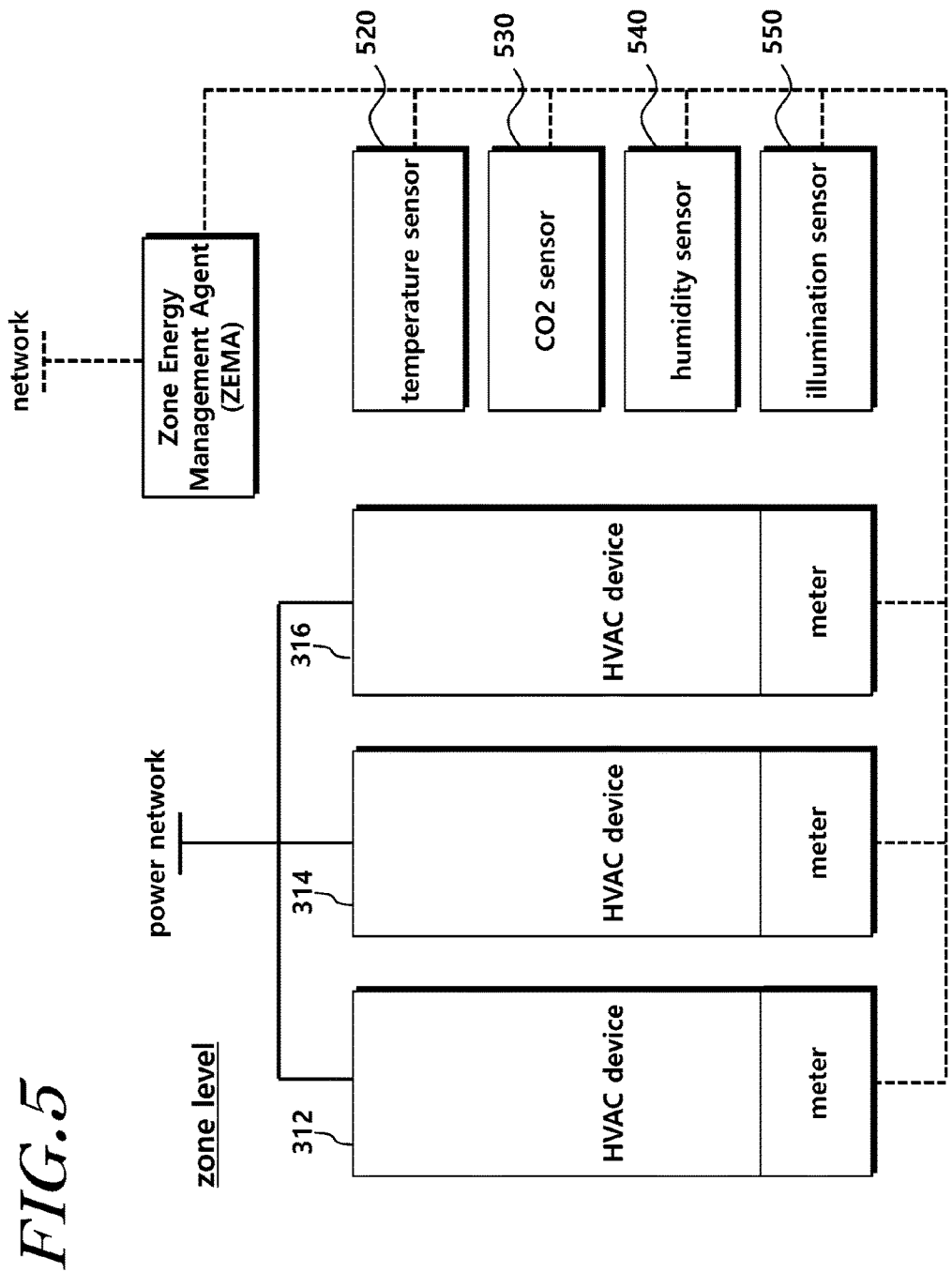
FIG. 5 is a block diagram illustrating a zone level system.

FIG. 5 is a block diagram illustrating a zone level system.

Referring to FIG. 5, energy devices 312 and 314, and a personal device 316 may be located in each zone.

The personal device 316 is an electronic device in which an individual characteristic is reflected and, for example, a Personal Computer (PC), a standing lamp on a table, and the like belong to the personal device 316. The energy devices 312 and 314 are electronic devices, which do not belong to the personal device 316, and mainly control an environment of each zone. For example, the Heating, Ventilation, Air Condition (HVAC) device 312 and the lighting device 314 belong to the energy devices.

A plurality of sensors are located in each zone and constitute a sensor network. For example, a temperature sensor 520, a $CO_2$ sensor 530, a humidity sensor 540, an illumination sensor 550, and the like may be located in each zone.

The zone agent (ZEMA) for managing total zone energy is located in the zone. Further, the zone agent (ZEMA) may acquire environment data from the sensors 520, 530, 540, and 550 and acquire device energy usage data from the energy devices 312 and 314, and the personal device 316.

The energy management system predicts an energy demand by using the hierarchical structure of the community.

Figure 6:
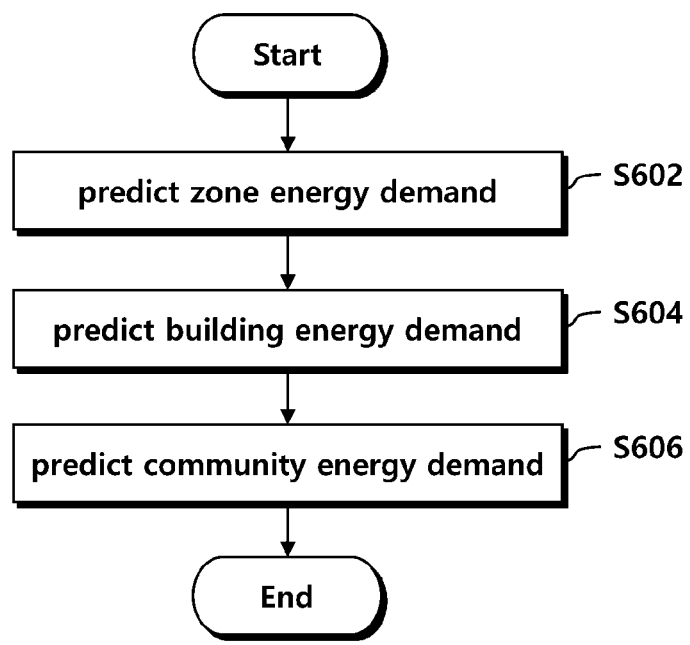
FIG. 6 is a flowchart illustrating a method of predicting an energy demand according to an embodiment.

FIG. 6 is a flowchart illustrating a method of predicting an energy demand according to an embodiment.

Referring to FIG. 6, an energy demand for each zone is first predicted in S602.

The zone agent (ZEMA) located in each zone transmits the environment data acquired from the sensor network and the device energy usage data acquired from the electronic device to the machine learning device and receives zone energy demand prediction data.

When the energy demand for each zone is predicted, an energy demand for each building is then predicted in S604.

The building agent (BEMA) located in each building transmits the zone energy demand prediction data for each zone and state information of building devices, which do not belong to each zone, to the machine learning device and receives building energy demand prediction data.

When the energy demand for each building is predicted, an energy demand for the whole community is then predicted in S606.

The community agent (CEMA) transmits the building energy demand prediction data for each building and state information of community devices, which do not belong to each building, to the machine learning device and receives community energy demand prediction data.

The energy management system may predict an energy demand of each zone through the hierarchical structure.

The method of predicting the energy demand in each layer will be described in more detail.

Figure 7:
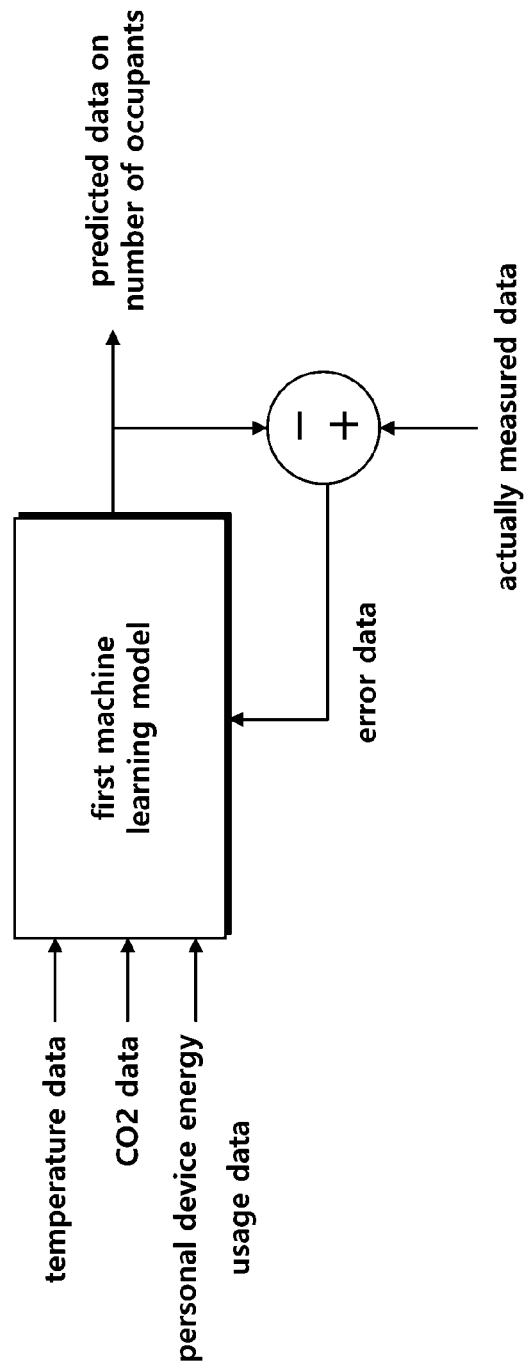
FIG. 7 is a block diagram illustrating a first machine learning model for predicting the number of occupants.
Figure 8:
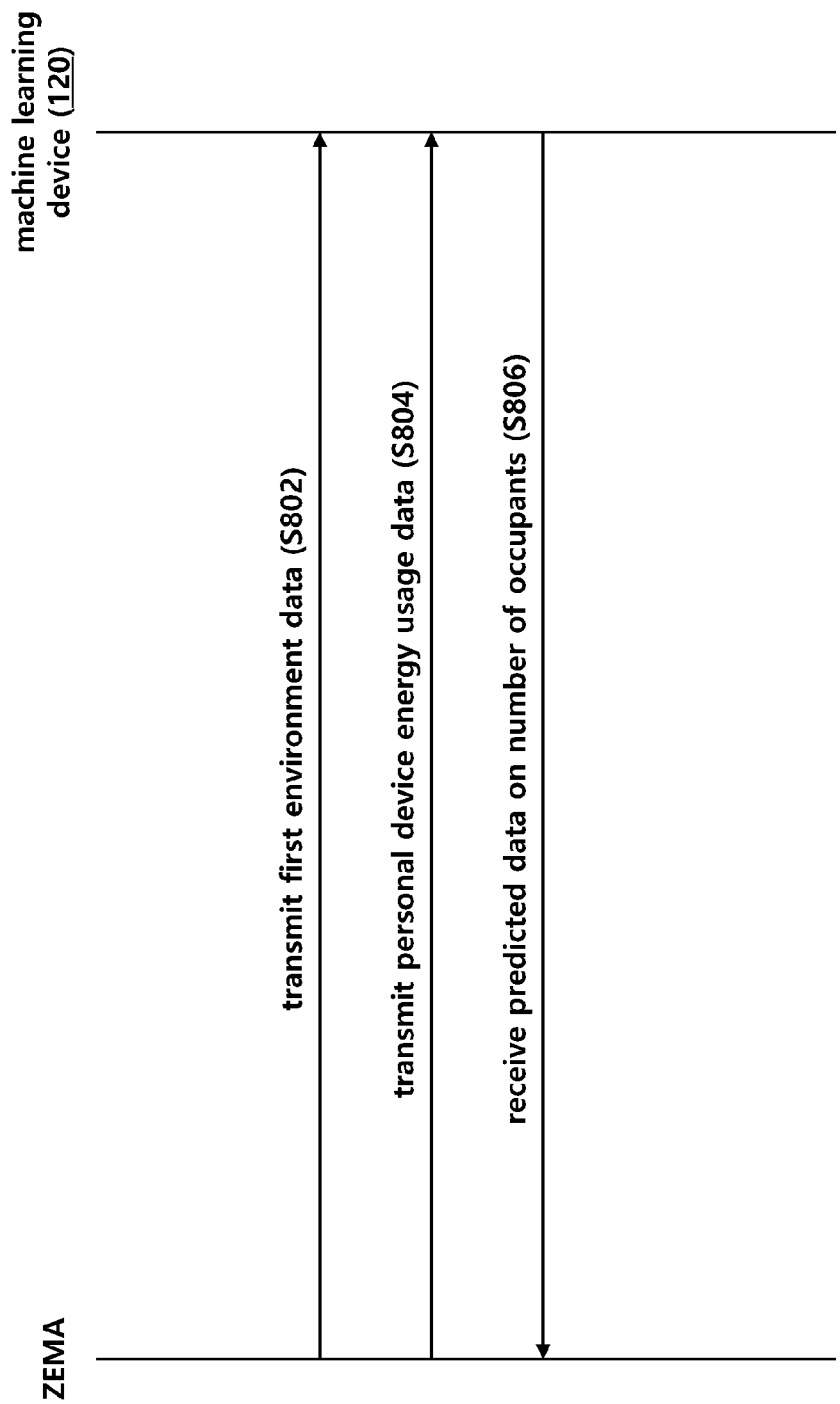
FIG. 8 is a flowchart illustrating a method of predicting the number of occupants in each zone.

FIG. 7 is a block diagram illustrating a first machine learning model for predicting the number of occupants, and FIG. 8 is a flowchart illustrating a method of predicting the number of occupants in each zone.

The energy management system may predict the number of occupants in each zone before predicting an energy demand for the zone. The energy management system may increase user convenience for occupants in each zone and properly maintain an energy efficiency by first predicting the number of occupants.

Referring to FIG. 7, the first machine learning model for predicting the number of occupants may include temperature data, $CO_2$ data, and personal device energy usage data as input data. The temperature data, the $CO_2$ data, and the personal device energy usage data are all parameters related to the occupants. For example, when the number of occupants in each zone increases, a $CO_2$ concentration also increases. The first machine learning model may learn a relationship between the $CO_2$ concentration and the number of occupants and, when the $CO_2$ data is input in the prediction step, predict the number of occupants through the input $CO_2$ data. The personal device energy usage data may also have a close correlation with the number of occupants. For example, when an energy usage of the PC is high, it may mean that a person who operates the PC exists in a corresponding zone. The first machine learning model may learn a relationship between the personal device energy usage data and the number of occupants and, when the personal device energy usage data is input in the prediction step, predict the number of occupants through the input personal device energy usage data.

The first machine learning model may further use the illumination data or wireless communication (for example, Bluetooth, WiFi, etc) data with a user terminal as the input data. In order to generate the wireless communication data, a wireless communication device, for example, a Bluetooth device may be disposed in each zone. The wireless communication device may determine whether the user is located indoor through wireless communication with the user terminal, for example, a mobile phone and generate a result of the determination as the wireless communication data.

The first machine learning model may use all the temperature data, the $CO_2$ data, and the personal device energy usage data as the input data or may use only some of the data as the input data according to some embodiments. For example, the first machine learning model may calculate the number of occupants while having the $CO_2$ data as the input data. Further, according to some embodiments, the first machine learning model may further include the temperature data and the personal device energy usage data as the input data.

The first machine learning model may generate error data by comparing predicted data on the number of occupants and actually measured data on the number of occupants, and change parameters and a structure of the first machine learning model to make an error value of the error data smaller. At this time, each zone may not include a sensor for measuring the number of occupants. In such a situation, the first machine learning model may use other information to secure actually measured data. For example, the zone agent (ZEMA) may include a UI device, and the number of occupants is occasionally input through the UI device. Such user input information may be used as the actually measured data of the first machine learning model.

The first machine learning model may generate not only the number of occupants but also an occupant pattern. The occupant pattern may be a value indicating the existence or non-existence of occupancy according to a lapse of time, and the first machine learning model may also generate the occupant pattern. The machine learning device may generate occupant estimation information including the number of occupants and the occupant pattern through the first machine learning model and generate zone energy demand prediction data based on the occupant estimation information. Hereinafter, although the number of occupants corresponding to an example of the occupant estimation information will be described, the occupant pattern may be used as another example.

Referring to FIG. 8, the zone agent (ZEMA) transmits first environment data to the machine learning device 120 in S802. The first environment data is environment data having a high correlation with the number of occupants in the environment data acquired from the sensor network installed in each zone and may correspond to, for example, temperature data and $CO_2$ data.

The zone agent (ZEMA) transmits personal device energy usage data to the machine learning device 120 in S804.

The machine learning device 120 calculates the number of occupants in each zone through the first machine learning model including the first environment data and the personal device energy usage data as input data, generates occupant prediction data, and transmits the generated occupant prediction data to the zone agent (ZEMA) in S806.

When the number of occupants is predicted, zone energy demand prediction data is then generated.

Figure 9:
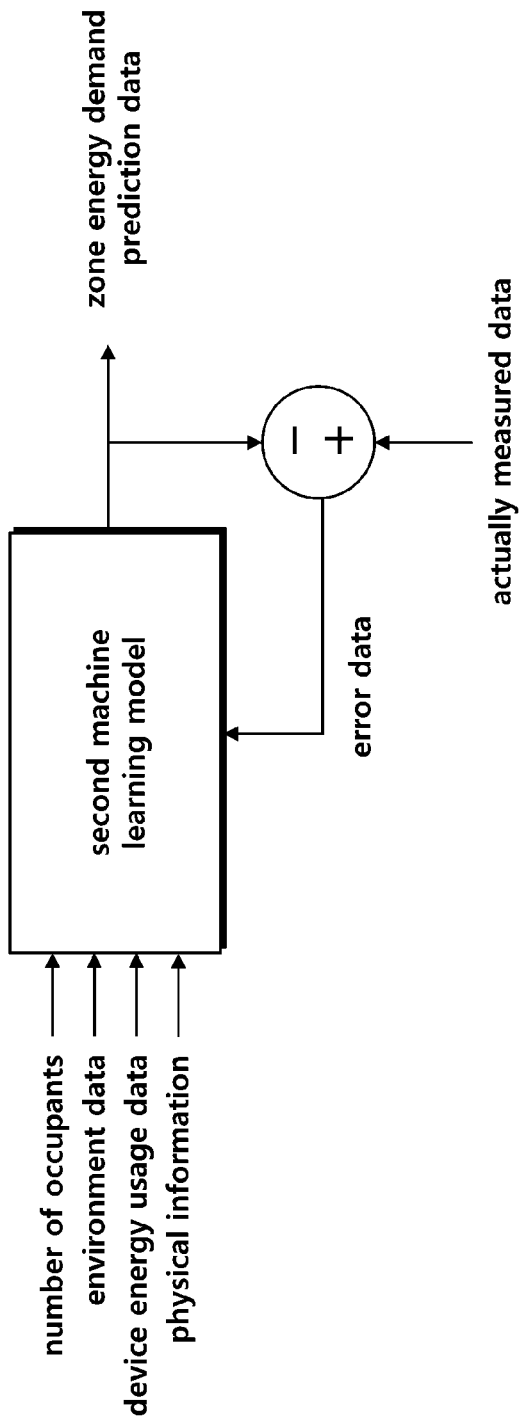
FIG. 9 is a block diagram illustrating a second machine learning model for predicting an energy demand for each zone.
Figure 10:
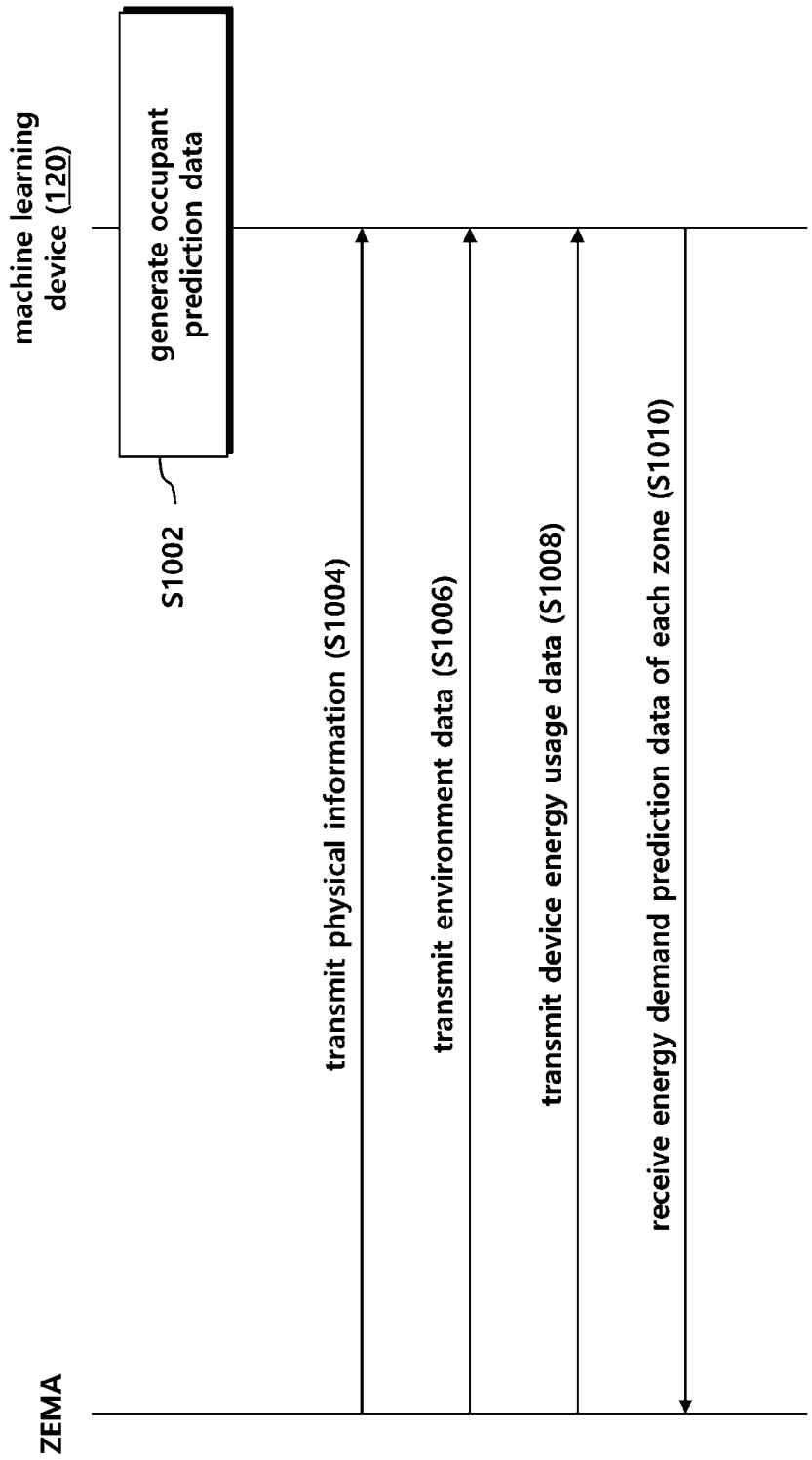
FIG. 10 is a flowchart illustrating a method of predicting an energy demand for each zone.

FIG. 9 is a block diagram illustrating a second machine learning model for predicting an energy demand for each zone, and FIG. 10 is a flowchart illustrating a method of predicting an energy demand for each zone.

Referring to FIG. 9, the second machine learning model for predicting an energy demand for each zone may include the number of occupants, environment data, device energy usage data of an electronic device (energy device and personal device), and physical information of each zone as input data. The physical information of each zone may include location information of each zone, area information of each zone, window and door information of each zone, and outer wall information of each zone. Further, the device energy usage data may include real time energy usage and energy usage pattern information. The environment data may include temperature data, humidity data, illumination data, $CO_2$ data, and the like.

The second machine learning model may learn a relationship between the input data and the zone energy usage and, when the input data is input in the prediction step, generate zone energy demand prediction data.

The second machine learning model may generate error data by comparing the zone energy demand prediction data and actually measured data, and change parameters and a structure of the second machine learning model to make an error value of the error data smaller. At this time, the actually measured data may be acquired through the device energy usage data.

Referring to FIG. 10, the machine learning device 120 may predict the number of occupants and generate predicted data on the number of occupants as described with reference to FIGS. 7 and 8.

The zone agent (ZEMA) manages physical information of the zone and aperiodically transmits the physical information to the machine learning device 120 in S1004.

The zone agent (ZEMA) transmits the environment data in S1006 and transmits the device energy usage data of the electronic device in S1008.

The machine learning device 120 may generate zone energy demand prediction data of each zone through the second machine learning model including the number of occupants, the environment data, the device energy usage data, and the physical information as input data and transmit the generated zone energy demand prediction data to the zone agent (ZEMA) in S1010.

The zone agent (ZEMA) manages energy of each zone based on the zone energy demand prediction data received for each zone.

The physical information of each zone may further include location information of each zone. The machine learning device may further acquire outdoor air data at a location of each zone from the zone agent (ZEMA) or another device, for example, a weather server, and further insert the outdoor air data into the second machine learning model as input data to generate zone energy demand prediction data.

The zone agent (ZEMA) may store the environment data, the device energy usage data, and the physical information in a local DataBase (DB) and periodically transmit the data stored in the local DB to a cloud DB associated with the machine learning device 120. The machine learning device 120 may generate the number of occupants or the zone energy demand prediction data based on the data stored in the cloud DB.

When the energy demand prediction for each zone is completed, the energy management system may collect the energy demand prediction and perform energy demand prediction for a building.

Figure 11:
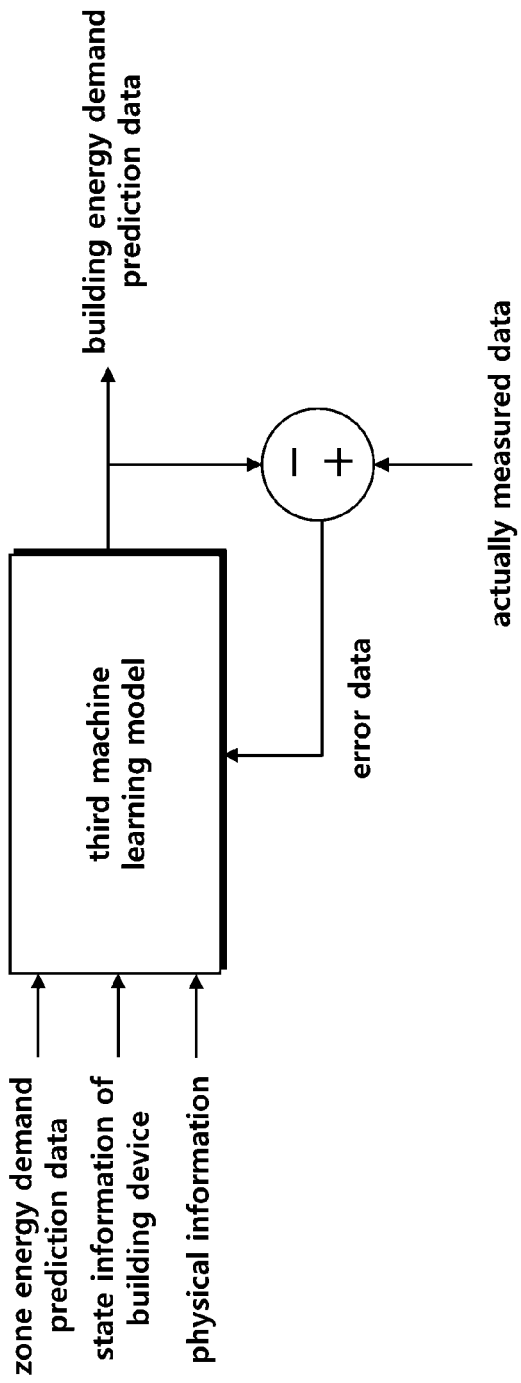
FIG. 11 is a block diagram illustrating a third machine learning model for predicting an energy demand for each building.
Figure 12:
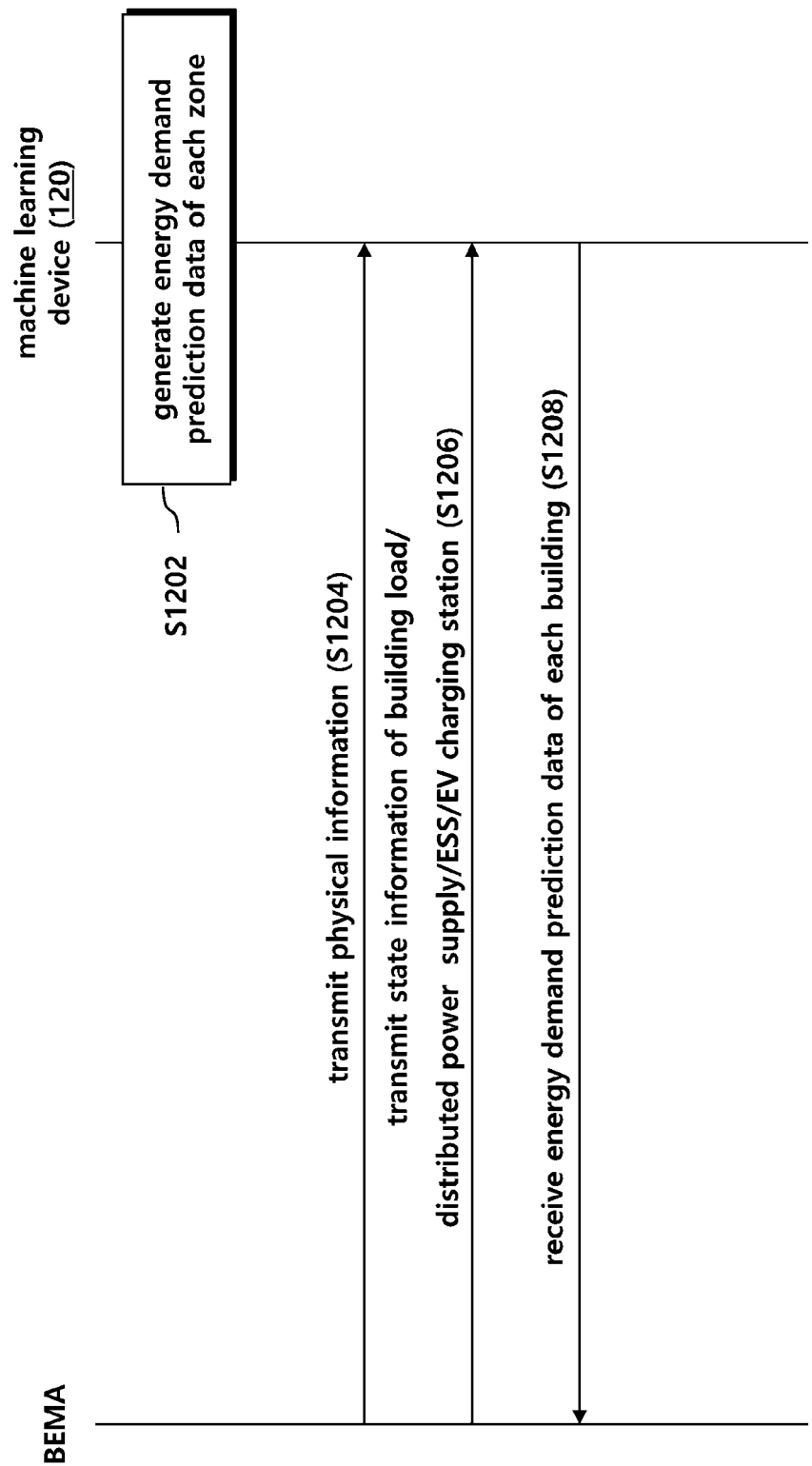
FIG. 12 is a flowchart illustrating a method of predicting an energy demand for each building.

FIG. 11 is a block diagram illustrating a third machine learning model for predicting an energy demand for each building and FIG. 12 is a flowchart illustrating a method of predicting an energy demand for each building.

Referring to FIG. 11, the third machine learning model for predicting an energy demand for each building may include zone energy demand prediction data, state information of a building device, and physical information of a building as input data. The physical information of the building may include location information of each building, area information of each building, window and door information of each building, outdoor wall information of each building, and the like. The state information of the building device may include, for example, information on an amount of generation of a building distributed power supply, an amount of charging of a building ESS, an amount of power supplied to an electronic car that accesses a building EV charging station, and the like.

The third machine learning model may learn a relationship between the input data and the building energy usage and, when the input data is input in the prediction step, generate building energy demand prediction data.

The third machine learning model may generate error data by comparing the building energy demand prediction data and actually measured data, and change parameters and a structure of the third machine learning model to make an error value of the error data smaller. At this time, the actually measured data may be acquired through energy usage data of each zone, energy usage data of the building device, or energy supply data.

Referring to FIG. 12, the machine learning device 120 generates energy demand prediction data for each zone in S1202.

The building agent (BEMA) manages physical information of the building and periodically or aperiodically transmits the physical information to the machine learning device 120 in S1204.

The building agent (BEMA) acquires state information of at least one building device among a building load, a building distributed power supply, a building ESS, and a building EV charging station and transmits the acquired state information to the machine learning device 120 in S1206.

The machine learning device 120 may generate building energy demand prediction data through the third machine learning model including the zone energy demand prediction data of each zone for each building, the state information of the building device, and the physical information of each building as input data and transmit the generated building energy demand prediction data to the building agent (BEMA) in S1208.

When the energy demand prediction for each building is completed, the energy management system may collect the energy demand prediction and perform energy demand prediction for community.

Figure 13:
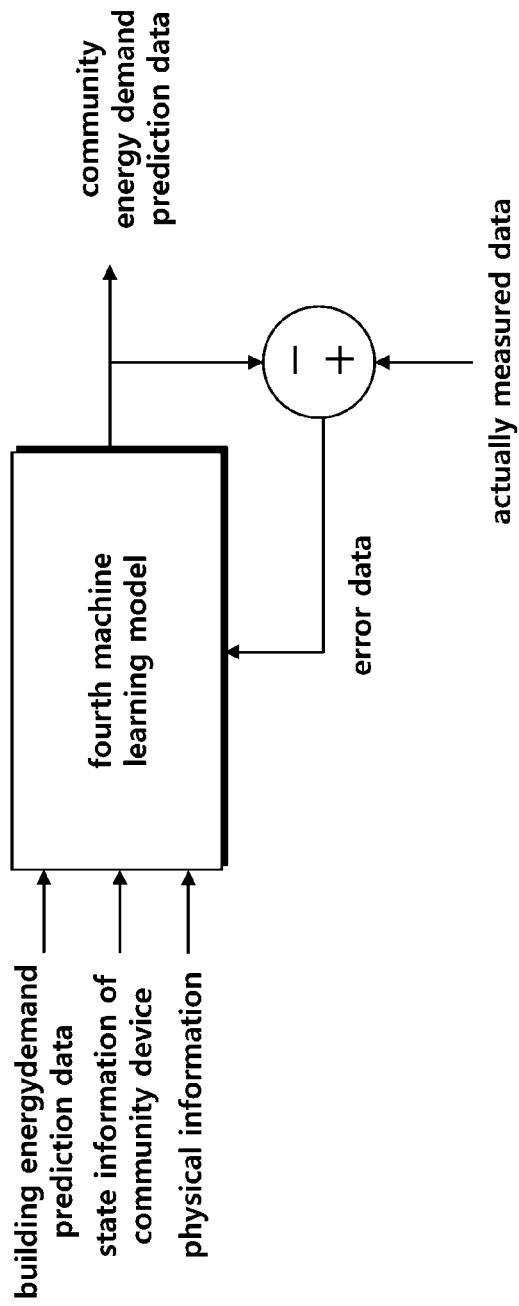
FIG. 13 is a block diagram illustrating a fourth machine learning model for predicting a community energy demand.
Figure 14:
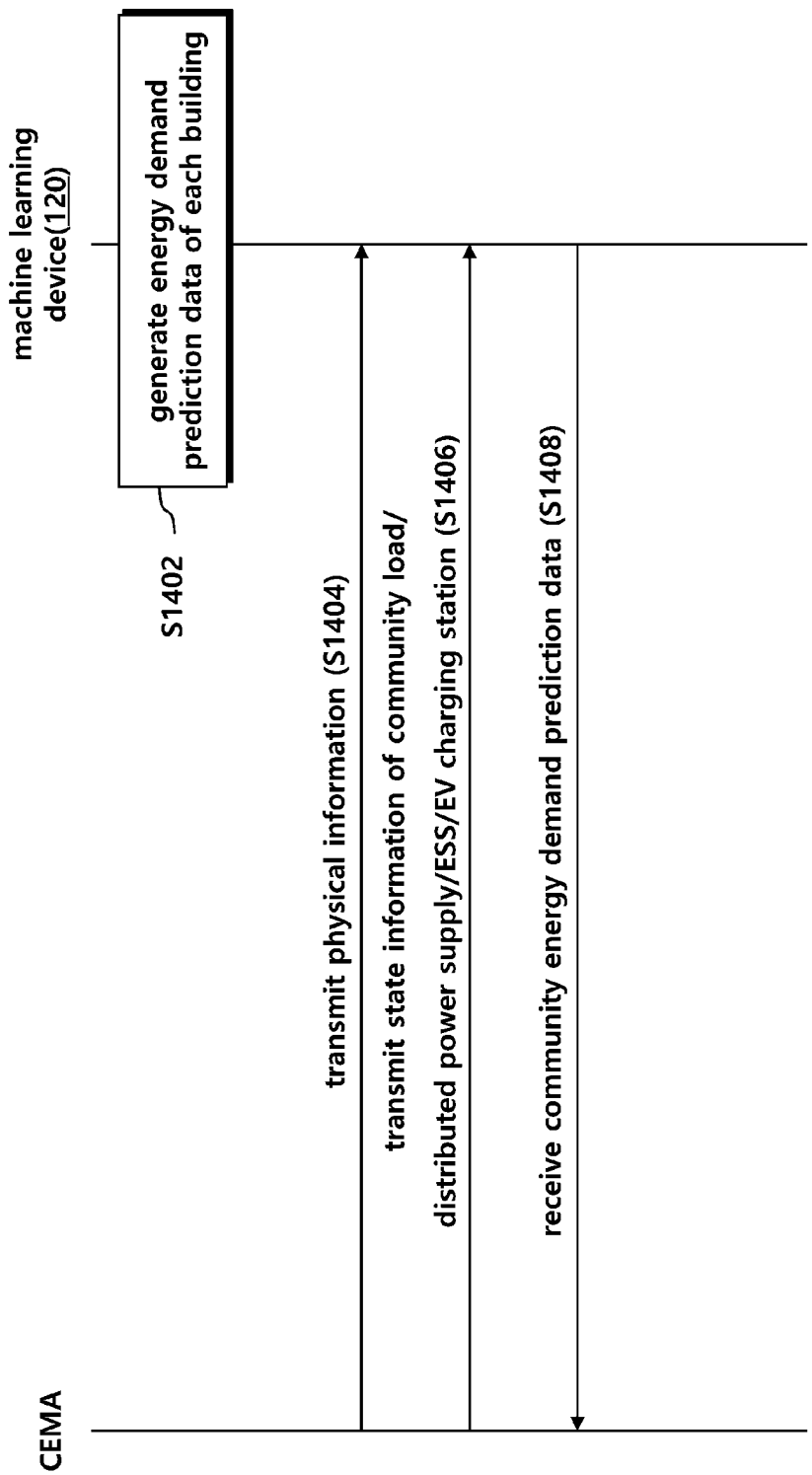
FIG. 14 is a flowchart illustrating a method of predicting a community energy demand.

FIG. 13 is a block diagram illustrating a fourth machine learning model for predicting a community energy demand and FIG. 14 is a flowchart illustrating a method of predicting a community energy demand.

Referring to FIG. 13, the fourth machine learning model for predicting a community energy demand may include building energy demand prediction data, state information of a community device, and physical information of a community as input data. The physical information of the community may include location information of the community and the like. The state information of the community device may include, for example, information on an amount of generation of a community distributed power supply, an amount of charging of a community ESS, an amount of power supplied to an electronic car that accesses a community EV charging station, and the like.

The fourth machine learning model may learn a relationship between the input data and the community energy usage and, when the input data is input in the prediction step, generate community energy demand prediction data.

The fourth machine learning model may generate error data by comparing the community energy demand prediction data and actually measured data, and change parameters and a structure of the fourth machine learning model to make an error value of the error data smaller. At this time, the actually measured data may be acquired through energy usage data of each building, energy usage data of the community device, or energy supply data.

Referring to FIG. 14, the machine learning device 120 generates energy demand prediction data for each building in S1402.

The community agent (CEMA) manages physical information of the community and periodically or aperiodically transmits the physical information to the machine learning device 120 in S1404.

The community agent (CEMA) acquires state information of at least one community device among a community load, a community distributed power supply, a community ESS, and a community EV charging station and transmits the acquired state information to the machine learning device 120 in S1406.

The machine learning device 120 may generate community energy demand prediction data through the fourth machine learning model including the building energy demand prediction data for each building, state information of the community device, and the physical information of the community as input data and transmit the generated community energy demand prediction data to the community agent (CEMA) in S1408.

The energy management system may generate an optimal control scenario and an energy management policy for each level based on the energy demand prediction data.

Figure 15:
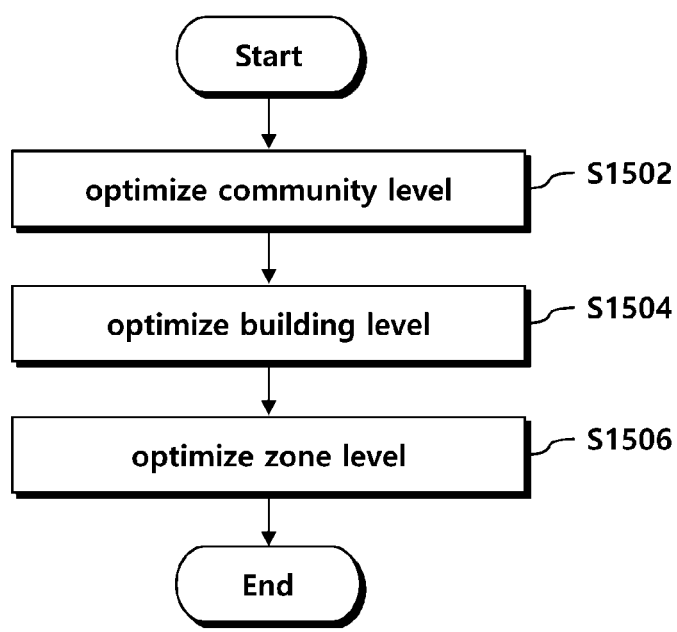
FIG. 15 is a flowchart illustrating a method of optimizing energy according to an embodiment.

FIG. 15 is a flowchart illustrating a method of optimizing energy according to an embodiment.

Referring to FIG. 15, the energy management system optimizes energy at a community level in S1502.

The community level may include a community device, which does not belong to each building, and an optimal control scenario for the community device may be generated in a community level optimization step. When the optimal control scenario for the community device is generated, the energy management system may generate the optimal control scenario to minimize energy costs. For example, the energy management system may control the energy usage of the community device every hour or totally based on demand reaction incentive and real time energy cost information and minimize the energy costs through the control. More specifically, the energy management system may schedule the use of the community device in a time zone in which the energy cost is low through the real time energy cost information and also schedule the use of the community device to reduce the use of energy in a time zone in which the demand reaction incentive is provided.

The energy management system may generate an optimal control scenario for directly controlling the community device, generate an energy management policy for inducing a particular objective function for buildings belonging to the community to be maximal, and transmit the generated optimal control scenario and energy management policy to the building agent of each building. The energy management policy is related to a policy for inducing a particular objective function value rather than a compulsory control signal to be maximal. For example, the energy management policy may include a policy for inducing a particular objective function such as a demand reaction incentive policy rather than a compulsory control signal such as load blocking or load scheduling to be maximal.

The community agent may generate the energy management policy to make the objective function maximal while using the objective function for making a total amount of the demand reaction incentive of the community maximal. For example, a subject that manages the community agent may be an energy demand management company that collects and operates buildings to participate in the demand reaction in the unit of communities. The energy demand management company may be a company that is established for the purpose of maximizing the total amount of the demand reaction incentive of the community.

Alternatively, the energy demand management company may be a company that is established for the purpose of maximizing a profit through participation in the demand reaction. In this case, the objective function used by the community agent may make a total amount of a demand management profit of the community maximal. The demand management profit may be an amount of money except for a building demand reaction incentive re-distributed to each building from a community demand reaction incentive received from the power trade market. When the building demand reaction incentive is excessively high, the community demand reaction incentive profit may be reduced. When the building demand reaction incentive is excessively low, a demand reaction adaptation index of each building becomes low and the community demand reaction incentive profit may be also reduced. The energy management system may generate an energy management policy in consideration of such things.

When the energy management policy is transmitted to the building agent, the energy management system optimizes energy at a building level in S1504.

A building device, which does not belong to each zone, may be included in the building level, and an optimal control scenario for the building device may be generated in a building level optimization step. When generating the optimal control scenario for the building device, the energy management system may generate the optimal control scenario to minimize energy costs. For example, the energy management system may control the energy usage of the building device every hour or totally based on demand reaction incentive and real time energy price information and minimize the energy costs through the control. More specifically, the energy management system may schedule the use of the building device in a time zone in which the energy cost is low through the real time energy price information and also schedule the use of the building device to reduce the use of energy in a time zone in which the demand reaction incentive is provided.

The demand reaction incentive may be included in the energy management policy received from the community agent. Since the building agent generates the optimal control scenario in consideration of the energy management policy received from the community agent, the building agent is not directly controlled by the community agent but may maintain an indirect control relationship with the community agent.

The energy management system may generate an optimal control scenario for directly controlling the building device, generate an energy management policy for inducing a particular objective function value for zones belonging to the building to be maximal, and transmit the generated optimal control scenario and energy management policy to the zone agent of each zone. The energy management policy is related to a policy for inducing a particular objective function value rather than a compulsory control signal to be maximal. For example, the energy management policy may include a policy for inducing a particular objective function such as a demand reaction incentive policy rather than a compulsory control signal such as load blocking or load scheduling to be maximal.

The building agent may generate the energy management policy to make the objective function minimum while using the objective function to make the energy cost of the building minimum.

The energy management policy which the community agent transmits to each building agent or the energy management policy which the building agent transmits to each zone agent may be differently determined according to each building agent or each zone agent. For example, the building agent may differently determine a first energy management policy for a first zone agent and a second energy management policy for a second zone agent. When the demand reaction incentive policy is used as the energy management policy, a demand reaction load capacity for receiving the demand reaction incentive is predetermined, so that it is required to properly distribute the demand reaction load capacity for each building or each zone and provide an incentive suitable for load participating in the demand reaction. To this end, the community agent may generate different energy management policies according to the building agent, so as to create a maximum demand management profit through each building agent. Further, the building agent may generate different energy management policies according to the zone agent, so as to minimize the energy cost of the entire building.

When the energy management policy is transmitted to the zone agent, the energy management system optimizes energy at a zone level in S1506.

Since the zone level does not have a lower level, generating an optimal control scenario for all devices (loads) which can be controlled may be important. Meanwhile, the energy management system generates the control scenario in consideration of convenience of users who live in each zone as well as the energy cost, so that the objective function may be different from objective functions at other levels.

When generating the optimal control scenario of the zone, the energy management system may generate the optimal control scenario in further consideration of user setting information, indoor/outdoor environment information, energy use pattern information of each device, occupant information, and the like as well as the energy management policy. Such information may be used for considering user convenience.

Hereinafter, a case where the demand reaction incentive policy is used as the energy management policy will be described as an example for the convenience of understanding.

Figure 16:
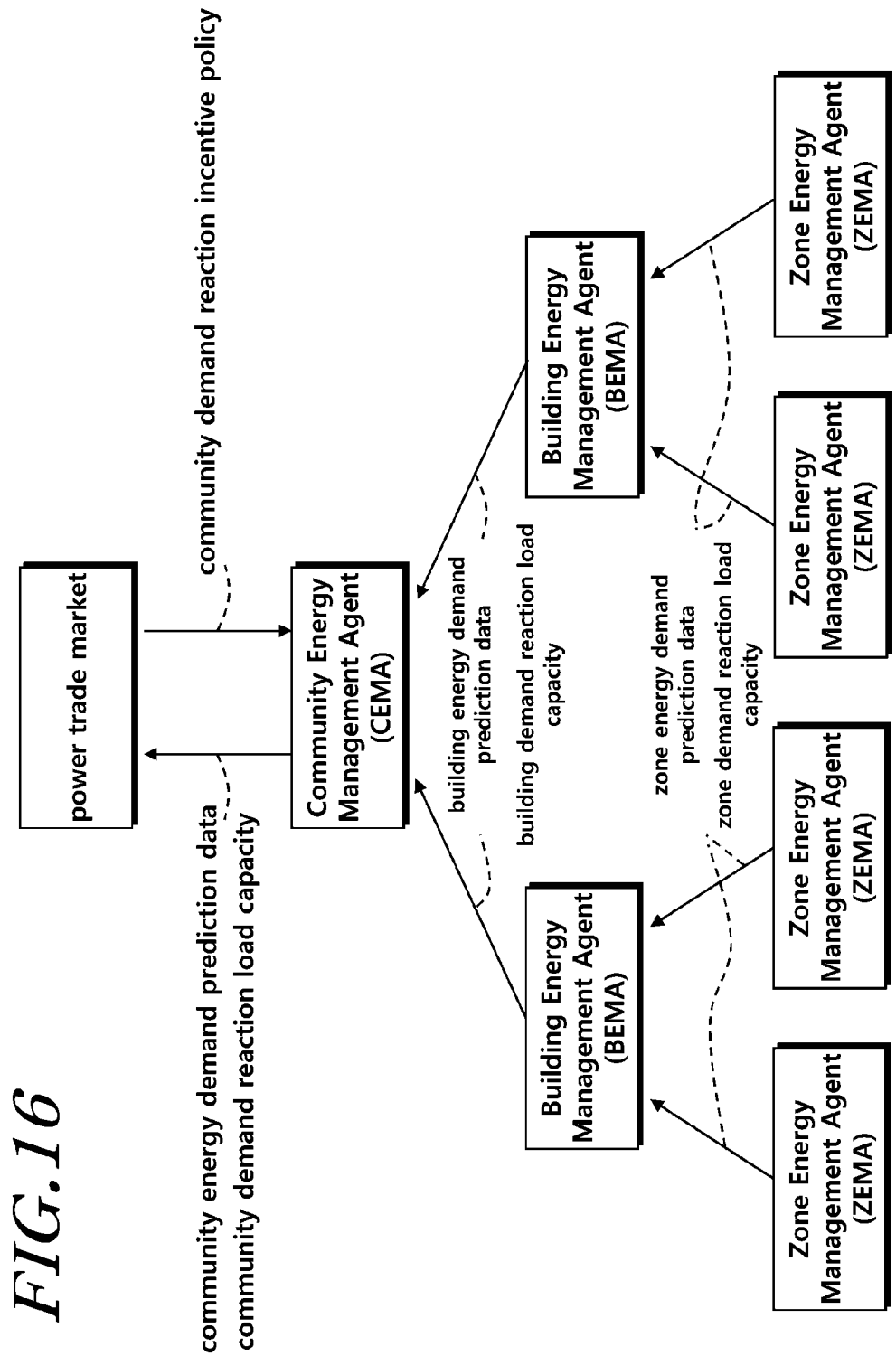
FIG. 16 illustrates a process of determining a community demand reaction incentive policy in an energy management system according to an embodiment.

FIG. 16 illustrates a process of determining a community demand reaction incentive policy in an energy management system according to an embodiment.

Referring to FIG. 16, each zone agent (ZEMA) calculates zone energy demand prediction data and a zone demand reaction load capacity and transmits the calculated zone energy demand prediction data and zone demand reaction load capacity to the building agent (BEMA). Each zone agent (ZEMA) may not transmit the zone demand reaction load capacity to the building agent (BEMA). The building agent (BEMA) may calculate and manage a load capacity predicted to participate in a demand reaction in each zone.

The building agent (BEMA) collects zone energy demand prediction data and adds energy demand prediction data of a building device, which does not belong to each zone, to generate building energy demand prediction data. The building agent (BEMA) collects zone demand reaction load capacities and calculates a demand reaction load capacity of a building device, which does not belong to each zone, to generate a building demand reaction load capacity. The building agent (BEMA) transmits the building energy demand prediction data and the building demand reaction load capacity to the community agent (CEMA). The building agent (BEMA) may not transmit the building demand reaction load capacity to the community agent (CEMA). The community agent (CEMA) may calculate and manage a load capacity predicted to participate in a demand reaction in each building.

The community agent (CEMA) collects building energy demand prediction data and adds energy demand prediction data of the community device, which does not belong to each building, to generate community energy demand prediction data. The community agent (CEMA) collects building demand reaction load capacities and calculates a demand reaction load capacity of a community device, which does not belong to each building, to generate a community demand reaction load capacity. The community demand reaction load capacity may be a value estimated through the machine learning model. In an embodiment in which the community agent (CEMA) does not receive the load capacity to participate in the demand reaction from each building agent (BEMA), the community agent (CEMA) may estimate and manage the community demand reaction load capacity.

The community agent (CEMA) may bid for the demand reaction system based on the community energy demand prediction data and the community demand reaction load capacity and receive a community demand reaction incentive policy as a result of the bid.

The community demand reaction incentive policy may be a demand reaction load capacity and a price policy. For example, the community demand reaction incentive policy may be a load capacity that participates in the demand reaction and a price policy of the load capacity. In a more detailed example, the community demand reaction incentive policy may be a size of the load capacity and a price of the load capacity per KW. At this time, the price may be differently determined in the unit of time. The building demand reaction incentive policy or the zone demand reaction incentive policy may also be the demand reaction load capacity and the price policy for the demand reaction load capacity.

Figure 17:
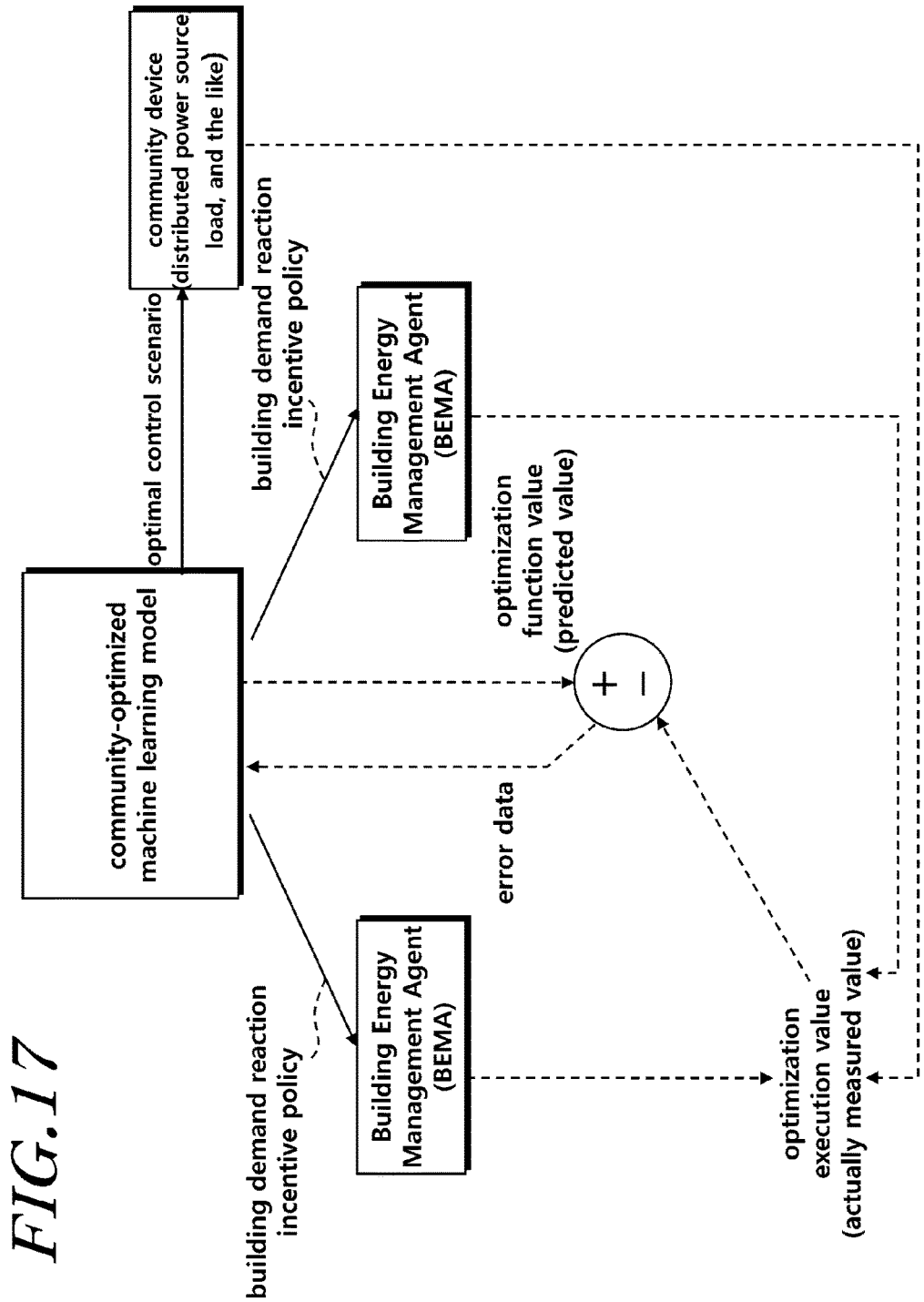
FIG. 17 illustrates a process for optimization at a community level according to an embodiment.

FIG. 17 illustrates a process for optimization at a community level according to an embodiment.

Referring to FIG. 17, the machine learning device may generate an optimal control scenario for the community device through the community-optimized machine learning model.

The community agent may acquire state information of at least one community device among a community load, a community distributed power supply, a community Energy Storage System (ESS), and a community Electric Vehicle (EV) charging station, which do not belong to the building, and transmits the acquired state information to the machine learning device.

The machine learning device may generate an optimal control scenario for the community device based on the state information of the community device and a community demand reaction incentive policy. At this time, the machine learning device may generate the optimal control scenario to minimize an energy cost of the community device.

When the optimal control scenario generated by the machine learning device is transmitted to the community agent, the community agent may control community devices according to the optimal control scenario.

Meanwhile, the machine learning device may generate a building demand reaction incentive policy to be applied to each building through a community-optimized machine learning model including building energy demand prediction data of each building, building energy usage data, and the community demand reaction incentive policy as input data. At this time, the generated building demand reaction incentive policy may vary depending on the building.

The community-optimized machine learning model may generate the building demand reaction incentive policy to make a particular optimization function maximum or minimum. Further, the community-optimized machine learning model may perform machine learning according to error data by a difference between a predicted value and an actually measured value for the optimization function.

For example, the optimization function may be a function for a community demand management profit. At this time, the community-optimized machine learning model may generate the building demand reaction incentive policy for each building to make the community demand management profit maximum. However, the demand reaction may not be conducted in a direction in which each building expects. In this case, the community-optimized machine learning model may determine that an internal parameter is not optimized and perform machine learning according to error data by the difference between the predicted value and the actually measured value.

For example, the machine learning device may generate the predicted value for the community demand management profit through the community-optimized machine learning model and receive the actually measured value for the community demand management profit from the community agent. Further, the machine learning device may learn the community-optimized machine learning model based on the error data according to the difference between the predicted value and the actually measured value.

In another example, the machine learning device may generate the predicted value for the demand management profit in a viewpoint of the community for each building through the community-optimized machine learning model and receive the actually measured value for the demand reaction incentive profile for each building from the community agent. Further, the machine learning device may learn the community-optimized machine learning model based on the error data according to the difference between the predicted value and the actually measured value.

The community-optimized machine learning model may calculate a demand reaction load capacity of each building as the building demand reaction incentive policy. In such an embodiment, the machine learning device may learn the community-optimized machine learning model based on error data according to a difference between the demand reaction load capacity calculated for each building through the community-optimized machine learning model and a load capacity of each building that actually participates in the demand reaction.

The community-optimized machine learning model may also generate a demand reaction adaptation index for each building. The demand reaction adaptation index may be used for calculating a demand reaction load capacity and an energy price for each building while being used as an internal parameter of the community-optimized machine learning model.

Meanwhile, the demand reaction adaptation index may be used for machine learning. The community-optimized machine learning model may further generate a demand reaction adaptation index prediction value for each building, and the machine learning device may learn the community-optimized machine learning model based on error data according to a difference between the demand reaction adaptation prediction value and an actually measured value.

Figure 18:
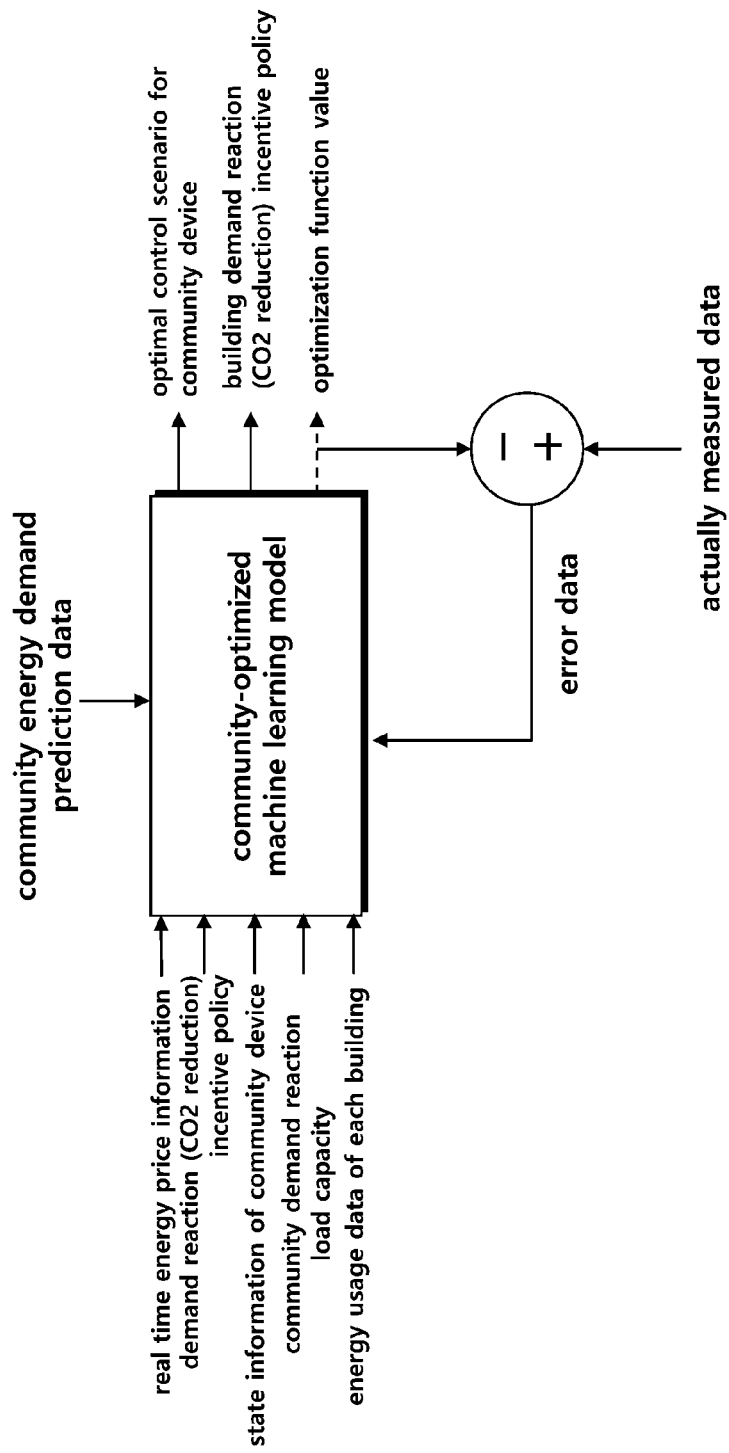
FIG. 18 is a block diagram illustrating a community-optimized machine learning model according to an embodiment.

FIG. 18 is a block diagram illustrating a community-optimized machine learning model according to an embodiment.

Referring to FIG. 18, the community-optimized machine learning model may include real time energy price information, a demand reaction incentive policy, a $CO_2$ reduction incentive policy, state information of the community device, energy usage data of each building, and community energy demand prediction data as input data.

The machine learning device may generate a community device optimal control scenario through the community-optimized machine learning model. The machine learning device may generate a building demand reaction incentive policy of each building through the community-optimized machine learning model. According to some embodiments, the machine learning device may further generate a $CO_2$ reduction incentive policy of each building.

The community-optimized machine learning model may generate output values to make an optimization function maximal or minimal.

$$\text{First optimization function} = i \times \text{energy cost} - k \times \text{demand reaction incentive profit} - j \times CO_2 \text{ reduction incentive profit} \quad \text{Equation (1)}$$

The $CO_2$ reduction incentive may be calculated by a function of new renewable energy usage or an electronic car charging amount, and i, k, and j may be determined according to selection of a demand management business operator or selection of an energy management system.

The community-optimized machine learning model may generate an optimization function value as an output, compare the generated optimization function value with actually measured data, and use the value for machine learning. Further, the community-optimized machine learning model may further include a demand reaction adaptation index of each building as input data. The demand reaction adaptation index may be generated by the community agent and transmitted to the machine learning device.

Figure 19:
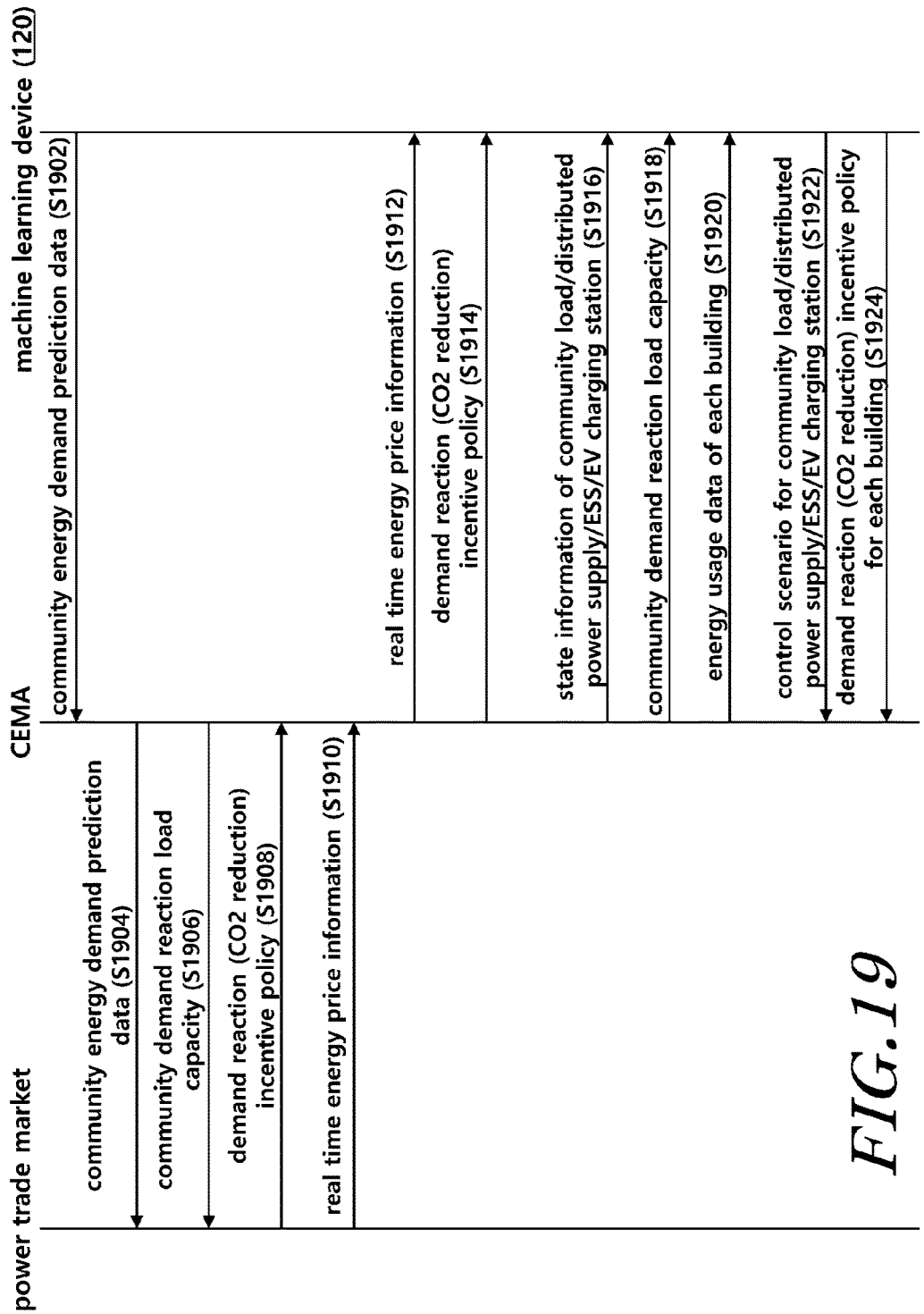
FIG. 19 is a flowchart illustrating a method of generating a community optimal control scenario according to an embodiment.

FIG. 19 is a flowchart illustrating a method of generating a community optimal control scenario according to an embodiment.

The community agent (CEMA) may manage a demand reaction load capacity for the community and receive real time energy price information, a demand reaction incentive policy, and a $CO_2$ reduction incentive policy from a power trade market. The community agent (CEMA) bids for the demand reaction system based on the community energy demand prediction data and the community demand reaction load capacity, and the demand reaction incentive policy and the $CO_2$ reduction incentive policy may be values received as a result of the bid. The community agent (CEMA) may periodically or aperiodically update the demand reaction incentive policy and the $CO_2$ reduction incentive policy through the bid.

Referring to FIG. 19, the machine learning device 120 generates community energy demand prediction data and transmits the generated community energy demand prediction data to the community agent (CEMA) in S1902.

The community agent (CEMA) transmits the community energy demand prediction data to the power trade market in S1904, and transmits the demand reaction load capacity which may participate in the demand reaction in the community, to the power trade market in S1906.

The power trade market such as a server for managing the power trade market in hardware may transmit the demand reaction incentive policy and the $CO_2$ reduction incentive policy to the community agent (CEMA) in accordance with the information in S1908.

The demand reaction incentive policy may include the load capacity which should participate in the demand reaction, information on time, and information on an incentive in the participation in the demand reaction. Further, the $CO_2$ reduction incentive policy may include incentive information according to the usage of each new renewable energy.

The power trade market may transmit real time energy price information to the community agent (CEMA) in S1910.

The community agent (CEMA) may transmit real time energy price information to the machine learning device 120 in S1912, and transmit the demand reaction incentive policy and the $CO_2$ reduction incentive policy in S1914.

The community agent (CEMA) may transmit state information of the community device to the machine learning device 120 in S1916, and transmit energy usage data of each building to the machine learning device 120 in S1920.

The machine learning device 120 may generate a demand reaction incentive policy of each building, a $CO_2$ reduction incentive policy of each building, and a control scenario for the community device through the community-optimized machine learning model including the real time energy price information, the demand reaction incentive policy, the $CO_2$ reduction incentive policy, the state information of the community device, the energy usage data of each building, and the community energy demand prediction data as input data, and transmit the generated demand reaction incentive policy of each building, a $CO_2$ reduction incentive policy of each building, and a control scenario for the community device to the community agent (CEMA) in S1922 and 1924.

The community agent (CEMA) may control the community device according to the control scenario for the community device and transmit the demand reaction incentive policy of each building and the $CO_2$ reduction incentive policy to each building agent (BEMA).

Meanwhile, the building agent may manage building energy demand prediction data including zone energy demand prediction data of each zone and a building demand reaction load capacity including a zone demand reaction load capacity, and manage a building demand reaction incentive policy applied to the building.

The machine learning device may generate a zone demand reaction incentive policy to be applied to each zone through a building-optimized machine learning model that includes the zone energy demand prediction data of each zone and the building demand reaction incentive policy as input data and calculates an energy cost of the building to be minimized and transmit the generated zone demand reaction incentive policy to the building agent.

The building agent may transmit the zone demand reaction incentive policy to the zone agent corresponding to each zone.

Figure 20:
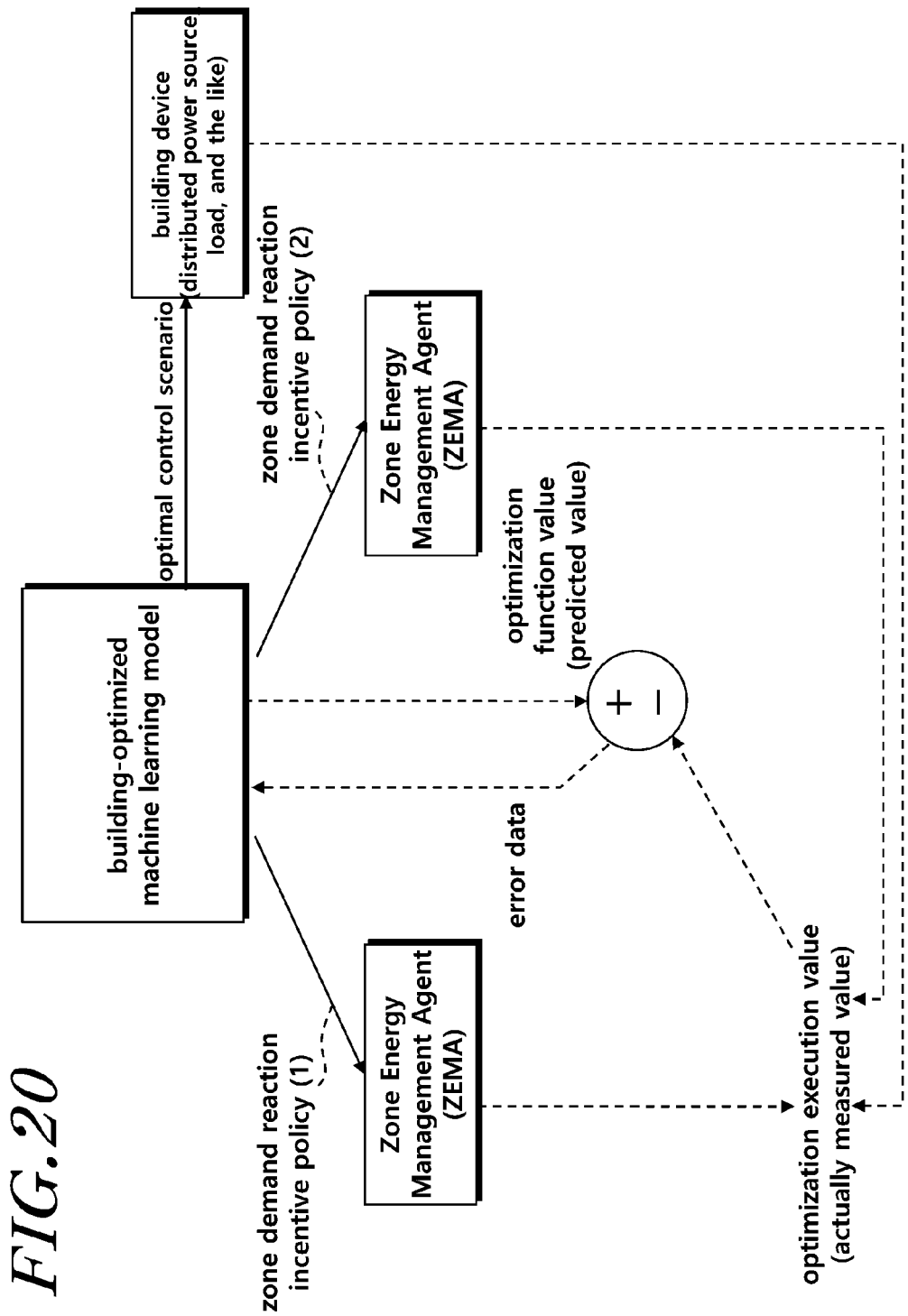
FIG. 20 illustrates a process for optimization at a building level according to an embodiment.

FIG. 20 illustrates a process for optimization at a building level according to an embodiment.

Referring to FIG. 20, the machine learning device may generate an optimal control scenario for the building device through the building-optimized machine learning model.

The building agent may acquire state information of at least one building device among a building load, a building distributed power supply, a building ESS, and a building EV charging station, which do not belong to the zone, and transmit the acquired state information to the machine learning device.

The machine learning device may generate an optimal control scenario for the building device based on the state information of the building device and a building demand reaction incentive policy. At this time, the machine learning device may generate the optimal control scenario to minimize an energy cost of the building device.

When the optimal control scenario generated by the machine learning device is transmitted to the building agent, the building agent may control building devices according to the optimal control scenario.

Meanwhile, the machine learning device may generate a zone demand reaction incentive policy to be applied to each zone through a building-optimized machine learning model including zone energy demand prediction data of each zone, zone energy usage data, and the zone demand reaction incentive policy as input data. At this time, the generated zone demand reaction incentive policy may vary depending on the zone.

The building-optimized machine learning model may generate the zone demand reaction incentive policy to make a particular optimization function maximal or minimal. Further, the building-optimized machine learning model may perform machine learning according to error data by a difference between a predicted value and an actually measured value for the optimization function.

For example, the optimization function may be a function for a building energy cost. At this time, the building-optimized machine learning model may generate the zone demand reaction incentive policy for each zone to make the building energy cost minimum. However, the demand reaction may not be performed in a direction in which each zone expects. In this case, the building-optimized machine learning model may determine that an internal parameter is not optimized and perform machine learning according to error data by the difference between the predicted value and the actually measured value.

Figure 21:
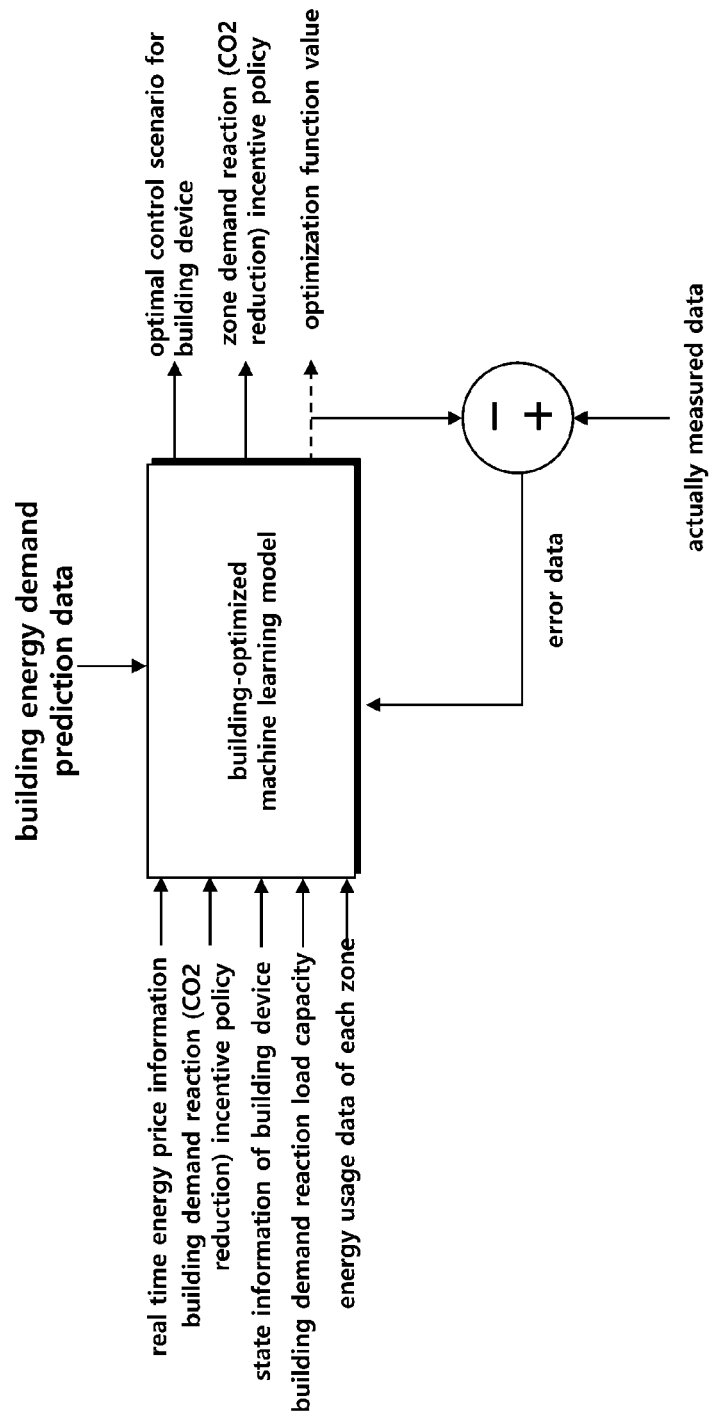
FIG. 21 is a block diagram illustrating a building-optimized machine learning model according to an embodiment.

FIG. 21 is a block diagram illustrating a building-optimized machine learning model according to an embodiment.

Referring to FIG. 21, the building-optimized machine learning model may include real time energy price information, a demand reaction incentive policy of each building, a $CO_2$ reduction incentive policy, state information of each building device, energy usage data of each zone, and building energy demand prediction data of each building as input data.

The machine learning device may generate a demand reaction incentive policy of each zone, a $CO_2$ reduction incentive policy of each zone, and a control scenario for the building device.

The building-optimized machine learning model may generate output values to minimize a second optimization function.

The second optimization function is a function that minimizes a total building energy usage, maximizes an incentive according to a demand reaction, and maximizes an incentive according to $CO_2$ reduction.

Figure 22:
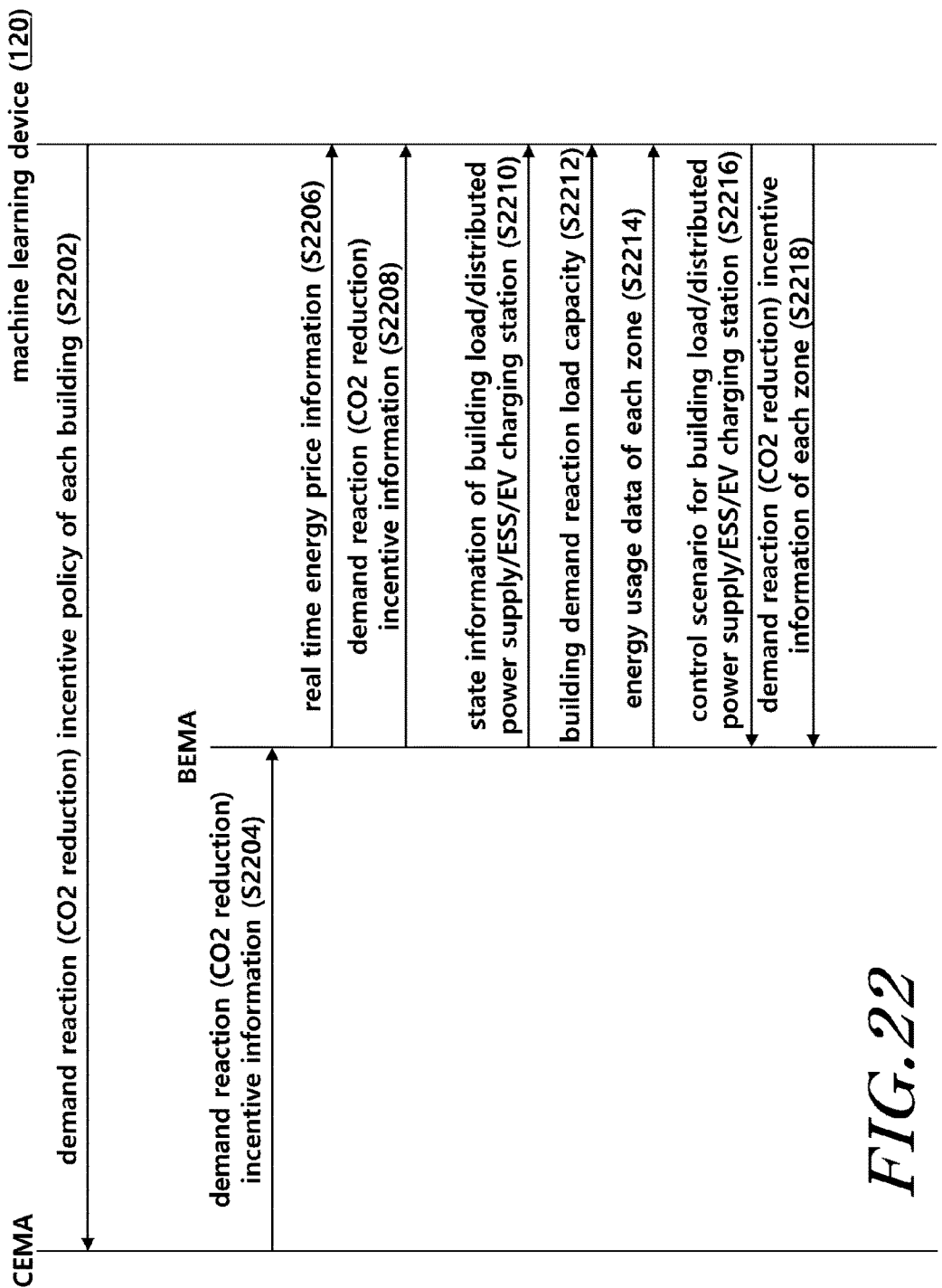
FIG. 22 is a flowchart illustrating a method of generating an optimal control scenario for a building according to an embodiment.

FIG. 22 is a flowchart illustrating a method of generating an optimal control scenario for a building according to an embodiment.

Referring to FIG. 22, the machine learning device 120 may transmit a demand reaction incentive policy of each building and a $CO_2$ reduction incentive policy to the community agent (CEMA) in S2202, and the community agent (CEMA) may transmit the demand reaction incentive policy of each building and the $CO_2$ reduction incentive policy to the building agent (BEMA) in S2204.

The building agent (BEMA) may transmit real time energy price information, the demand reaction incentive policy of each building, the $CO_2$ reduction incentive policy, state information of the building device, demand reaction load information of the building, energy usage data of each zone, and the like to the machine learning device 120 in S2206, S2208, S2210, S2212, and S2214.

The machine learning device 120 may generate a demand reaction incentive policy of each zone, a $CO_2$ reduction incentive policy of each zone, and a control scenario for each building device through a building-optimized machine learning model including the real time energy price information, the demand reaction incentive policy of each building, the $CO_2$ reduction incentive policy, the state information of each building device, the energy usage data of each zone, and the building energy demand prediction data of each building as input data, and transmit the generated demand reaction incentive policy of each zone, $CO_2$ reduction incentive policy of each zone, and control scenario for each building device to the building agent (BEMA) in S2216 and S2218.

The machine learning device 120 may calculate a demand reaction load capacity of each zone and a demand reaction adaptation index, and generate a demand reaction incentive policy of each zone and a $CO_2$ reduction incentive policy based on the demand reaction load capacity of each zone and the demand reaction adaptation index.

Figure 23:
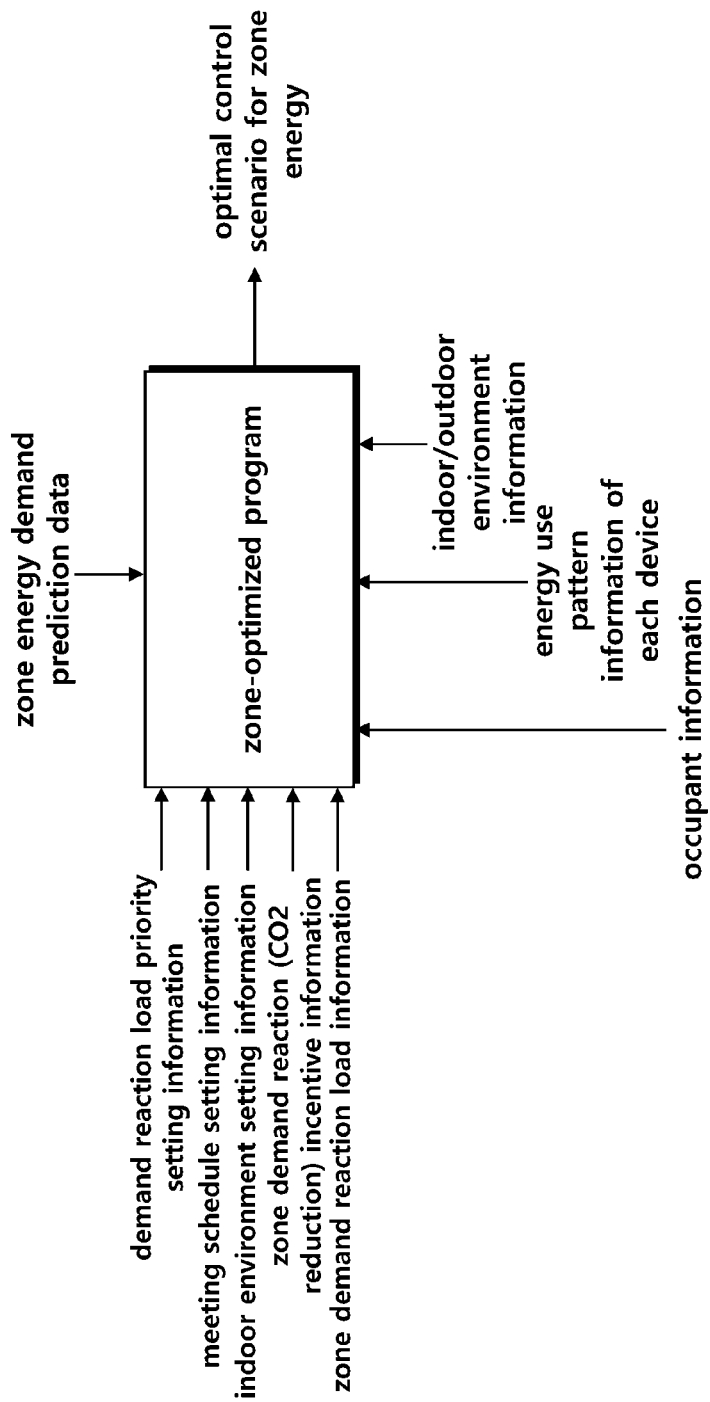
FIG. 23 is a block diagram illustrating a zone-optimized program for generating an optimal control scenario for each zone according to an embodiment.
Figure 24:
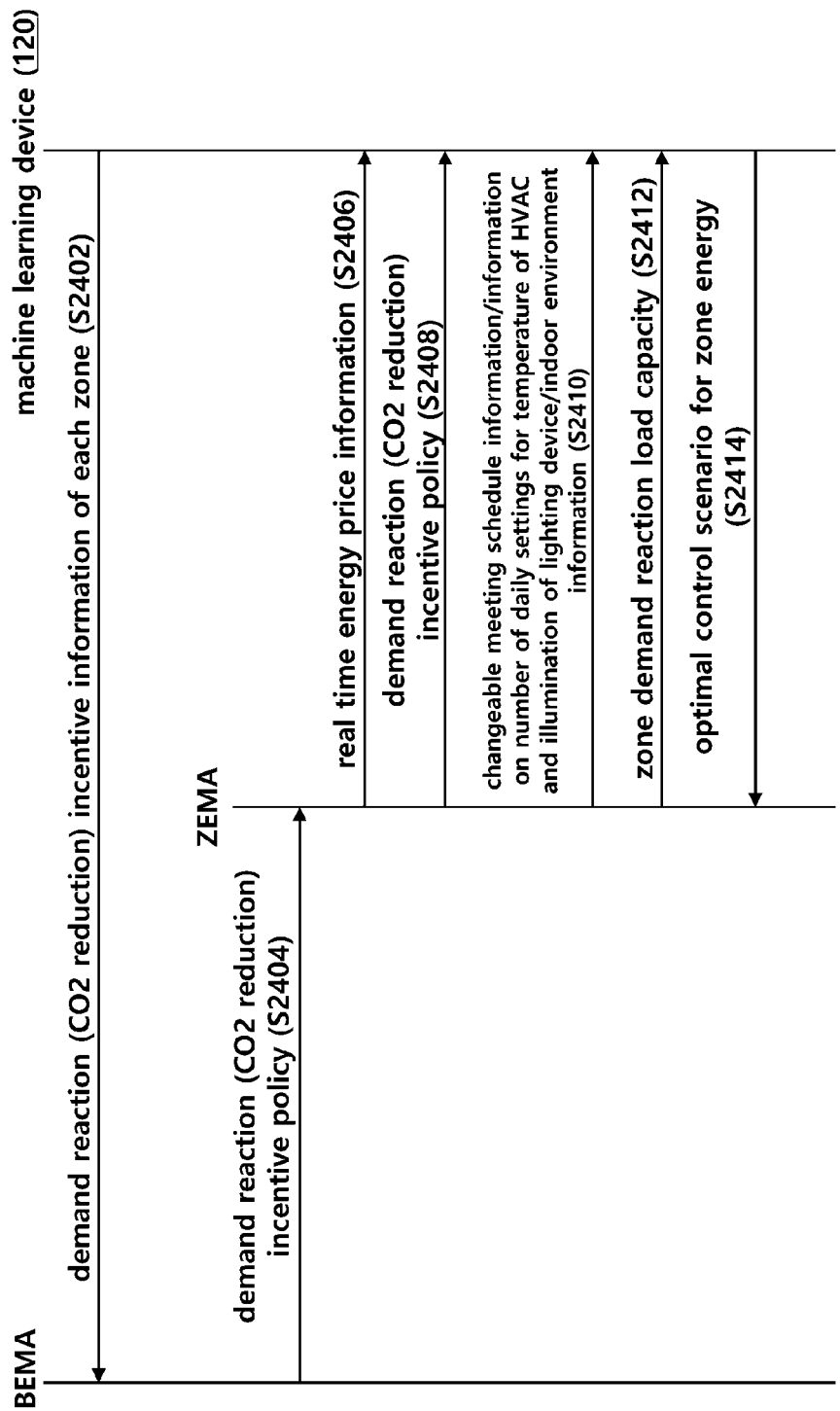
FIG. 24 is a flowchart illustrating a method of generating an optimal control scenario for each zone according to an embodiment.

FIG. 23 is a block diagram illustrating a zone-optimized program for generating an optimal control scenario for each zone according to an embodiment, and FIG. 24 is a flowchart illustrating a method of generating an optimal control scenario for each zone according to an embodiment.

The zone agent (ZEMA) may mange demand reaction load information of each zone and receive a demand reaction incentive policy of each zone and a $CO_2$ reduction incentive policy from the building agent (BEMA).

Referring to FIG. 23, the zone-optimized program for generating an optimal control scenario for each zone may include real time energy price information, a demand reaction incentive policy and a $CO_2$ reduction incentive policy of each zone, occupant information in each zone, device energy usage data (or energy use pattern information of each device) of an energy device and a personal device operating in each zone, and zone energy demand prediction data of each zone as input data.

In another example, the zone-optimized program may include user setting information, indoor/outdoor environment information, energy use pattern information of each device, occupant information, zone demand reaction load information, and zone energy demand prediction data as input data. The user setting information may be, for example, demand reaction priority setting information, meeting schedule setting information, indoor environment setting information.

The machine learning device may generate an optimal control scenario for the energy device and the personal device operating in each zone through the zone-optimized program.

The zone agent may further manage meeting schedule setting information and information on the number of daily settings for temperature or illumination of the energy device, and the zone-optimized program may further include the meeting schedule setting information and the information on the number of settings as input data and generate an optimal control scenario for a meeting schedule, indoor temperature, indoor illumination, and the like.

The zone-optimized program may further include user setting information as input data. For example, the zone agent (ZEMA) may include a UI device, generate priority information of a load device to participate in the demand reaction, changeable meeting schedule information, desired indoor environment information (for example, temperature, humidity, illumination, fine dust, and the like), and input the generated information into the zone-optimized program as the user setting information. The zone agent (ZEMA) having no input of occupants may generate the user setting information as a default value or a previously set value.

The zone-optimized program may generate a control scenario to make a third optimization function minimum (or maximum).

Third optimization function=$i$×energy cost−$h$×user convenience

User convenience=$a$×comfort index−$b$×number of settings for energy device+$c$×proximity of user setting value  Equation (2)

In equation (2), i, h, a, b, and c may be controlled by the user, the comfort index may be a function of temperature, humidity, $CO_2$ concentration, and fine dust concentration, and the number of settings for the energy device may be, for example, the number of changes in the setting for the HVAC or the number of changes in illumination of the lighting device. The proximity of the user setting value may be, for example, a proximity between indoor temperature set by the user and actually measured indoor temperature. Alternatively, the proximity of the user setting value may be, for example, a proximity between the indoor temperature set by the user and indoor temperature to be controlled by the zone agent (ZEMA).

The optimal control scenario may include an operation command value of each device and thus the zone agent (ZEMA) may control each device according to the operation command value. The control scenario for the building device and the control scenario for the community device may also include the operation command value, and each of the agents (BEMA and CEMA) may control corresponding devices according to the operation command value.

Referring to FIG. 24, the machine learning device 120 may transmit a demand reaction incentive policy and a $CO_2$ reduction incentive policy of each zone to the building agent (BEMA) in S2402, and the building agent (BEMA) may transmit the demand reaction incentive policy and the $CO_2$ reduction incentive policy of each zone to the zone agent (ZEMA) in S2404.

The zone agent (ZEMA) may transmit real time price information, the demand reaction incentive policy and the $CO_2$ reduction incentive policy of each zone, the number of occupants in each zone, device energy usage data of an energy device and a personal device operating in each zone, and zone energy demand prediction data of each zone to the machine learning device 120 in S2406, S2408, and S2410.

The machine learning device may generate a control scenario for the energy device and the personal device operating in each zone through the zone-optimized program and transmit the generated control scenario to the zone agent (ZEMA) in S2414.

Figure 25:
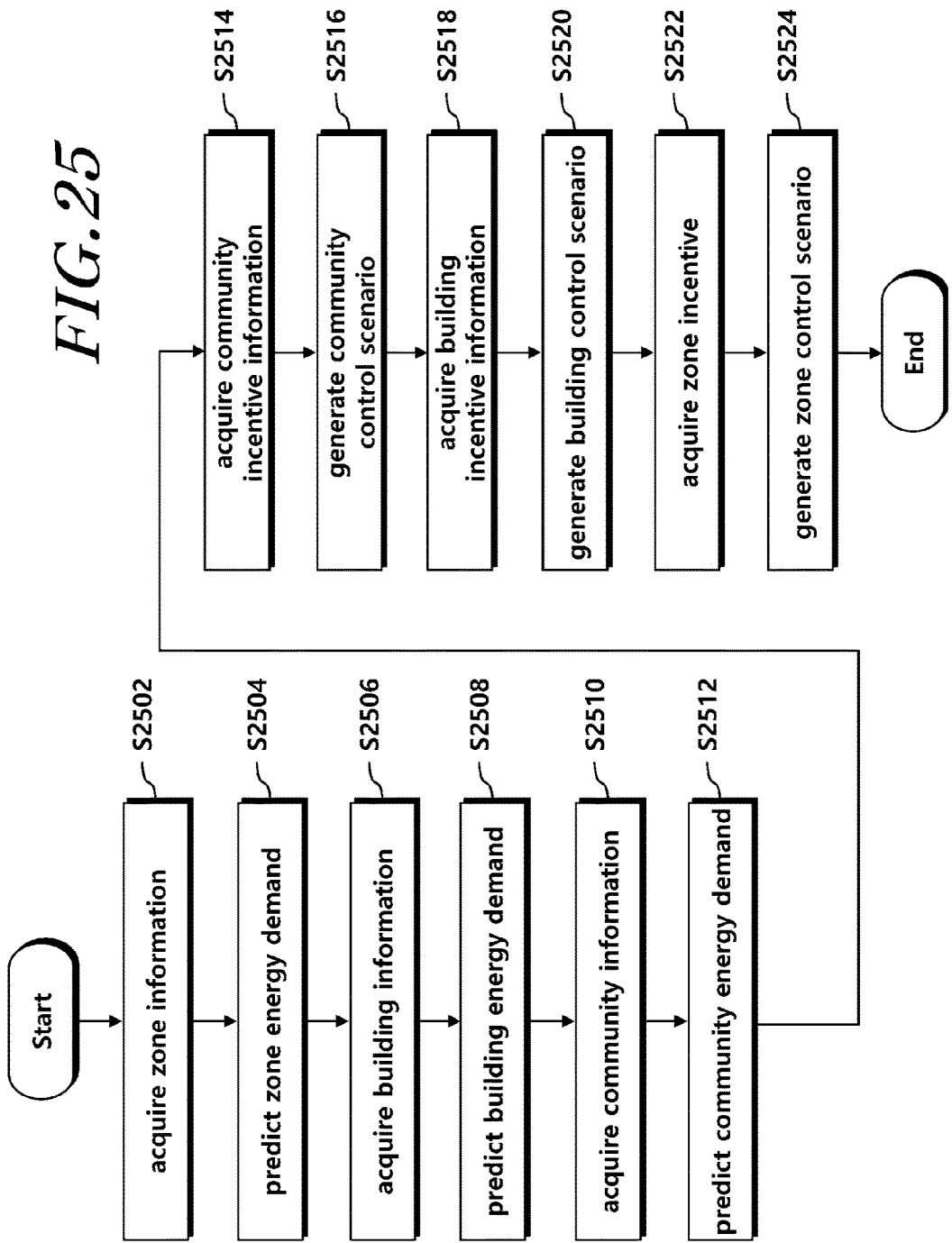
FIG. 25 is a flowchart illustrating a method of managing energy according to another embodiment.

FIG. 25 is a flowchart illustrating a method of managing energy according to another embodiment.

Referring to FIG. 25, an energy management system for managing energy of at least one community in which at least one building divided into at least one zone exists may acquire environment data of each zone from a sensor network installed in each zone, acquire device energy usage data of an energy device and a personal device operating in each zone, and acquire physical information of each zone in S2502.

The energy management system may generate occupant information in each zone through a first machine learning model including temperature data and $CO_2$ data of the environment data and the device energy usage data of the personal device as input data, and generate zone energy demand prediction data of each zone through a second machine learning model including the occupant information, the environment data, the device energy usage data of the energy device and the personal device, and the physical information of each zone as input data in S2504. The energy management system may manage energy of each zone based on the zone energy demand prediction data.

The energy management system may acquire state information of at least one building device among a building load, a building distributed power supply, a building Energy Storage System (ESS), and a building Electric Vehicle (EV) charging station, which do not belong to the zone in each building, and acquire physical information of each building in S2506.

With respect to each building, the energy management system may generate building energy demand prediction data through a third machine learning model including zone energy demand prediction data of each zone, state information of a building device, and physical information of each building as input data in S2508.

The energy management system may acquire state information of at least one community device among a community load, a community distributed power supply, a community Energy Storage System (ESS), and a community Electric Vehicle (EV) charging station, which do not belong to the building in the community, and acquire physical information of the community in S2510.

The energy management system may generate community energy demand prediction data through a fourth machine learning model including building energy demand prediction data of each building, state information of a community device, and physical information of the community as input data in S2512.

The energy management system may acquire demand reaction load information of the community and receive real time energy price information, a demand reaction incentive policy, and a $CO_2$ reduction incentive policy from a power management server (a server for managing a power trade market) in S2514.

The energy management system may generate a demand reaction incentive policy of each building, a $CO_2$ reduction incentive policy of each building, and a control scenario for the community device through the community-optimized machine learning model including the real time energy price information, the demand reaction incentive policy, the $CO_2$ reduction incentive policy, the state information of the community device, the energy usage data of each building, and the community energy demand prediction data as input data in S2516.

Further, the energy management system may acquire the demand reaction incentive policy and the $CO_2$ reduction incentive policy in S2518.

The energy management system may generate a demand reaction incentive policy of each zone, a $CO_2$ reduction incentive policy of each zone, and a control scenario for each building device through the building-optimized machine learning model including the real time energy price information, the demand reaction incentive policy of each building, the $CO_2$ reduction incentive policy, the state information of each building device, the energy usage data of each zone, and the building energy demand prediction data of each building as input data in S2520.

Further, the energy management system may acquire the demand reaction incentive policy and the $CO_2$ reduction incentive policy in S2522.

The energy management system may generate a control scenario for an energy device and a personal device operating in each zone through the zone-optimized program including the real time energy price information, the demand incentive policy and a $CO_2$ reduction incentive policy of each zone, occupant information of each zone, device energy usage data of an energy device and a personal device operating in each zone, and zone energy demand prediction data of each zone as input data in S2524.

Figure 26:
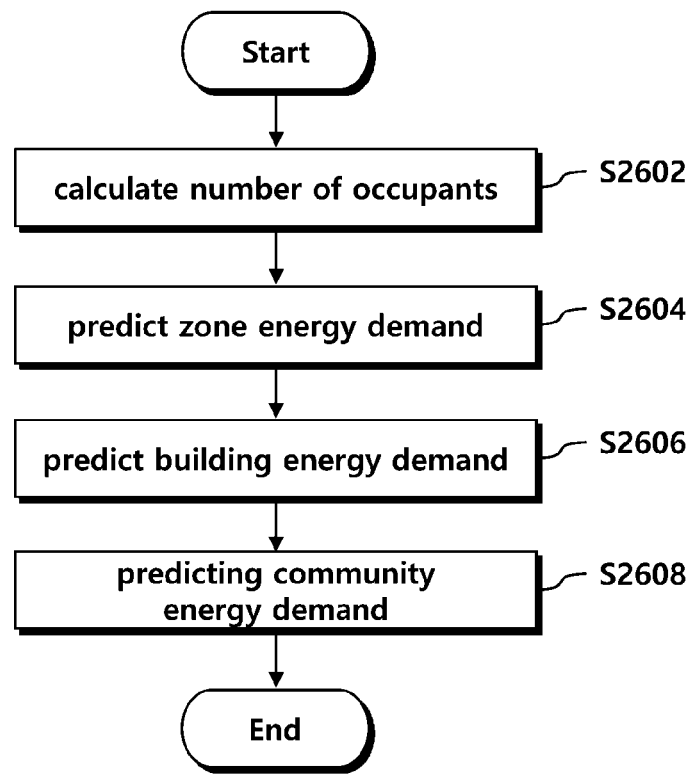
FIG. 26 is a flowchart illustrating a method of predicting an energy demand according to another embodiment.

FIG. 26 is a flowchart illustrating a method of predicting an energy demand according to another embodiment.

Referring to FIG. 26, with respect to at least one community in which at least one building divided into at least one zone exists, an energy management system may calculate the number of occupants in each zone through a first machine learning model including $CO_2$ data of each zone as input data in S2604.

The energy management system may generate zone energy demand prediction data of each zone through a second machine learning model including the number of occupants, environment data of each zone, and device energy usage data as input data in S2604.

The energy management system may generate building energy demand prediction data of each building through a third machine learning model including zone energy demand prediction data of each zone and state information of a building device which does not belong to each zone in S2606.

The energy management system may generate community energy demand prediction data of the community through a fourth machine learning model including building energy demand prediction data of each building and state information of a community device which does not belong to each building in S2608.

The first machine learning model may further include temperature data of each zone and device energy usage data of a personal device located in each zone as input data, the second machine learning model may further include physical information of each zone as input data, the third learning model may further include physical information of each building as input data, and the fourth machine learning model may further include physical information of the community as input data.

Figure 27:
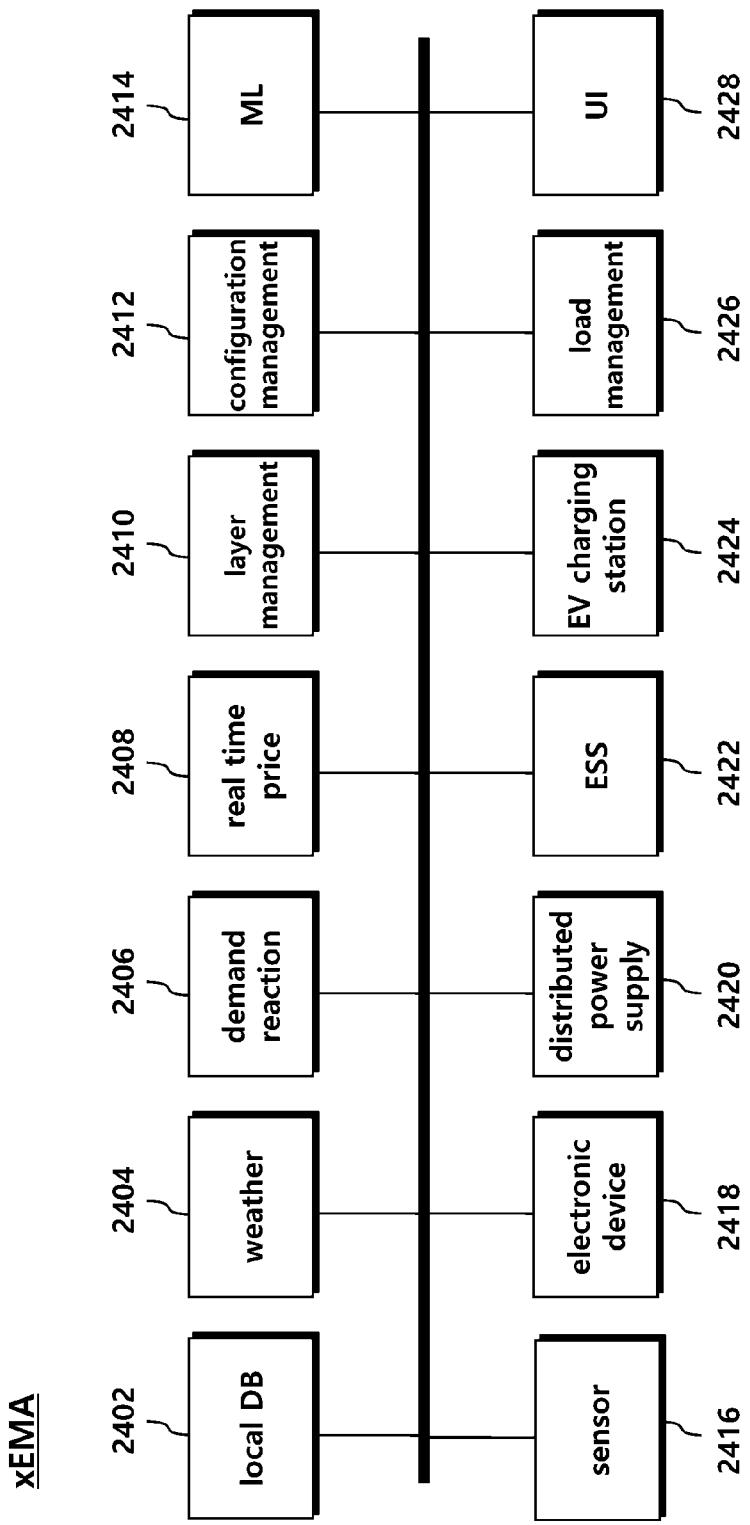
FIG. 27 is a block diagram illustrating the inside of an xEMA.

FIG. 27 is a block diagram illustrating the inside of an xEMA.

All of the zone agent (ZEMA), the building agent (BEMA), and the community agent (CEMA) may have the same structure of the xEMA. Each of the agents (ZEMA, BEMA, and CEMA) may set some elements to be active or non-active as necessary.

The xEMA may include a local DB 2402 for locally storing data, a weather device 2404 for acquiring weather information or outdoor air data, a demand reaction device 2406 for managing demand reaction information and processing a demand reaction command value, a real time price device 2408 for managing a real time energy price of power, a layer management device 2410 for managing a hierarchical structure of the agents, a configuration management device 2412 for diagnosing a trouble of the agent, a Machine Learning (ML) device 2414 for managing machine learning and other controls, a sensor measurement device 2416 for acquiring environment data from a sensor, an electronic device measurement device 2418 for acquiring energy usage data from an electronic device, a distributed power supply control device 2420 for acquiring state information of a distributed power supply and controlling the distributed power supply, an ESS control device 2422 for acquiring state information of an ESS and controlling the ESS, an EV charging station control device 2424 for acquiring state information of an EV charging station and controlling the EV charging station, a load management device 2426 for controlling and managing load, a UI device 2428 for providing a UI, and the like.

Figure 28:
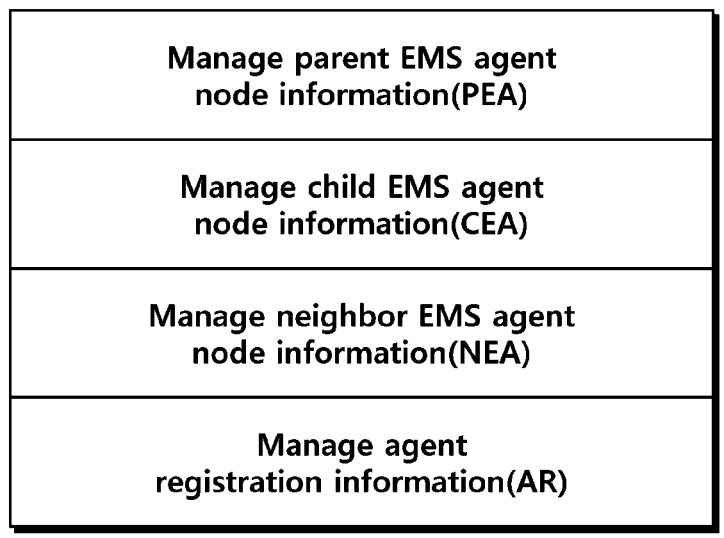
FIG. 28 is a block diagram illustrating in detail the layer management device of FIG. 27.

FIG. 28 is a block diagram illustrating in detail the layer management device of FIG. 27.

The layer management device 2410 may include a PEA module for managing node information of a parent EMS agent corresponding to a high layer level, a CEA module for managing node information of a child EMS agent corresponding to a low layer level, and an NEA module for managing node information of a neighbor EMS agent and an AR module for managing agent registration information which correspond to the same level.

Referring back to FIG. 2, the community agent (CEMA) may manage node information of the building agent (BEMA) corresponding to the low layer level through the CEA module and, when the building agent (BEMA) of a particular node breaks down, control the building agent (BEMA) of another node to perform instead a function of the broken building agent (BEMA).

When the community agent (CEMA) corresponding to the highest layer breaks down, one of the building agents (BEMA) corresponding to the low layer level may perform instead a function of the community agent (CEMA).

At this time, the other agent that replaces the broken agent may have a preset priority and perform the function instead according to the priority. Such an automatic trouble recovery function can be performed because respective agents have the same structure and the agents operate in parallel rather than sequentially.

The embodiments of the present invention have been described until now. According to the embodiments, the EMS can reflect various (energy) environments for each zone of a building, a reliability of a total system does not deteriorate even though a partial failure is generated, plug & play of the device is possible, and a present condition of occupancy of an occupant, an energy use pattern, and convenience can be reflected.

Further, according to the embodiments, it is possible to provide an energy management system technology for optimally determining user convenience and energy costs for each zone of the building. In addition, according to the embodiments, it is possible to solve the problem of the conventional top-down type (a centralized integrated control type) and reflect an independent energy management policy of each zone to determine an energy management policy of the entire area.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A system for managing energy of a community in which at least one building having at least one divided zone is located, the system comprising:
   at least one zone agent for acquiring environment data of each zone from a sensor network installed in each zone, acquiring device energy usage data of an energy device and a personal device operating in each zone, and managing physical information of each zone;
   a machine learning device for generating occupant estimation information of each zone through a first machine learning model including temperature data and $CO_2$ data of the environment data and the device energy usage data of the personal device as input data, generating zone energy demand prediction data of each zone through a second machine learning model including the occupant estimation information, the environment data, the device energy usage data of the energy device and the personal device, and the physical information of each zone as input data, and transmitting the generated occupant estimation information and zone energy demand prediction data to the zone agent,
   wherein the zone agent manages and controls energy distribution to each individual zone based on the zone energy demand prediction data received for each zone, and
   a building agent for acquiring state information of at least one building device among a building load, a building distributed power supply a building Energy Storage System (ESS), and a building Electric Vehicle (EV) charging station, which do not belong to the zone in each building, and managing physical information of each building, wherein the machine device generates building energy demand prediction data through a third machine learning model including the zone energy demand prediction data of each zone in each building, the state information of the building device, and the physical information of each building as input data and transmits the generated building energy demand prediction data to the building agent.

2. The system of claim 1, wherein the first machine learning model further includes illumination data or wireless communication data with a user terminal as the input data.

3. The system of claim 1, wherein the physical information of each zone further includes location information of each zone, the machine learning device further acquires outdoor air data at a location of each zone from the zone agent or another device, and the second machine learning model generates the zone energy demand prediction data with the outdoor air data as additional input data.

4. The system of claim 1, further comprising a community agent for acquiring state information of at least one community device among a community load, a community distributed power supply, a community ESS, and a community EV charging station, which do not belong to the building in the community, wherein the machine device generates community energy demand prediction data through a fourth machine learning model including the building energy demand prediction data of each building, the state information of the community device, and the physical information of the community as input data and transmits the generated building energy demand prediction data to the community agent.

5. The system of claim 4, wherein the community agent manages the building energy demand prediction data of each building and building energy usage data and manages a community demand reaction incentive policy applied to the community, the machine learning device includes the building energy demand prediction data of each building, the building energy usage data, and the community demand reaction incentive policy as input data, generates a building demand reaction incentive policy to be applied to each building through a community-optimized machine learning model for calculating a best community demand management profit of the community, and transmits the generated building demand reaction incentive policy to the community agent, and the community agent transmits the building demand reaction incentive policy to a building agent corresponding to each building.

6. The system of claim 5, wherein the machine learning device generates a predicted value of the community demand management profit through the community-optimized machine learning model, receives an actually measured value of the community demand management profit from the community agent, and learns the community-optimized machine learning model based on error data according to a difference between the predicted value and the actually measured value.

7. The system of claim 5, wherein the community agent bids for a demand reaction system based on the community energy demand prediction data and a community demand reaction load capacity and receives the community demand reaction incentive policy as a result of the bid.

8. The system of claim 5, wherein the machine learning device learns the community-optimized machine learning model based on error data according to a difference between a load capacity of each building which actually participates in a demand reaction and a demand reaction load capacity calculated for each building as one element of the community demand reaction incentive policy.

9. The system of claim 5, wherein the community-optimized machine learning model further generates a predicted value of a demand reaction adaptation index of each building, and the machine learning device learns the community-optimized machine learning model based on error data according to a difference between the predicated value and an actually measured value of the demand reaction adaptation index.

10. The system of claim 5, wherein the building agent manages the zone energy demand prediction data and the zone energy usage data of each zone and manages the building demand reaction incentive policy applied to the building, the machine learning device generates a zone demand reaction incentive policy to be applied to each zone through a building-optimized machine learning model, which includes the zone energy demand prediction data and the zone energy usage data of each zone and the building demand reaction incentive policy as input data and calculates minimum energy costs for the building, and transmits the generated zone demand reaction incentive policy to the building agent, and the building agent transmits the zone demand reaction incentive policy to the zone agent corresponding to each zone.

11. The system of claim 10, wherein the zone agent manages user setting information, indoor/outdoor environment information, energy use pattern information of each device, and occupant information, and manages the zone demand reaction incentive policy, and the machine learning device generates an optimal control scenario for a device within the zone through a zone-optimized program that includes the user setting information, the indoor/outdoor environment information, the energy use pattern information of each device, and the occupant information as input data and calculates an optimal value of an objective function including user convenience and energy cost reduction as parameters, and transmits the optimal control scenario to the zone agent.

12. The system of claim 11, wherein the user convenience is measured with a factor corresponding to proximity between the number of settings of an energy device or an energy device setting value and an energy device measurement value.

13. A method of managing energy of a community in which at least one building having at least one divided zone is located, the method comprising:
acquiring environment data of each zone from a sensor network installed in each zone, acquiring device energy usage data of an energy device and a personal device operating in each zone, and acquiring physical information of each zone;
calculating a number of occupants in each zone through a first machine learning model including temperature data and $CO_2$ data of the environment data and the device energy usage data of the personal device as input data, and generating zone energy demand prediction data of each zone through a second machine learning model including the occupant estimation information, the environment data, the device energy usage data of the energy device and the personal device, and the physical information of each zone as input data;
managing and controlling with a zone agent energy distribution to each individual zone based on the zone energy demand prediction data of each zone;
acquiring state information of at least one building device among a building load, a building distributed power supply, a building Energy Storage System (ESS), and a building Electric Vehicle (EV) charging station, which do not belong to the zone in each building, and acquiring physical information of each building; and
generating building energy demand prediction data through a third machine learning model including the zone energy demand prediction data of each zone in each building, the state information of the building device, and physical information of each building as input data.

14. The method of claim 13, further comprising:
acquiring state information of at least one community device among a community load, a community distributed power supply, a community ESS, and a community EV charging station, which do not belong to the building in the community; and
generating community energy demand prediction data through a fourth machine learning model including the building energy demand prediction data of each building, the state information of the community device, and the physical information of the community as input data.

15. The method of claim 14, further comprising:
managing the community energy demand prediction data and a community demand reaction load capacity including a building demand reaction load capacity of each building and managing a community demand reaction incentive policy applied to the community; and
generating a building demand reaction incentive policy to be applied to each building through a community-optimized machine learning model that includes the building energy demand prediction data of each building, building energy usage data, and the community demand reaction incentive policy as input data and calculates a maximum community demand management profit for the community.

16. The method of claim 15, further comprising generating a predicted value of the community demand management profit through the community-optimized machine learning model, receiving an actually measured value of the community demand management profit from the community agent, and learning the community-optimized machine learning model based on error data according to a difference between the predicted value and the actually measured value.

* * * * *